US011003328B2

(12) United States Patent
Jiao et al.

(10) Patent No.: US 11,003,328 B2
(45) Date of Patent: May 11, 2021

(54) TOUCH INPUT METHOD THROUGH EDGE SCREEN, AND ELECTRONIC DEVICE

(71) Applicant: Samsung Electronics Co., Ltd., Suwon-si (KR)

(72) Inventors: Ruwen Jiao, Tianjin (CN); Minghui Liu, Tianjin (CN); Shuang Li, Tianjin (CN); Weixing Quan, Tianjin (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/765,858

(22) PCT Filed: Aug. 31, 2016

(86) PCT No.: PCT/KR2016/009678
§ 371 (c)(1),
(2) Date: Apr. 4, 2018

(87) PCT Pub. No.: WO2017/086578
PCT Pub. Date: May 26, 2017

(65) Prior Publication Data
US 2019/0114044 A1    Apr. 18, 2019

(30) Foreign Application Priority Data

Nov. 17, 2015 (CN) .......................... 201510788114.1
Aug. 23, 2016 (KR) .......................... 10-2016-0106979

(51) Int. Cl.
*G06F 3/0484* (2013.01)
*G06F 3/0488* (2013.01)
(Continued)

(52) U.S. Cl.
CPC .......... *G06F 3/0484* (2013.01); *G06F 1/1652* (2013.01); *G06F 3/017* (2013.01);
(Continued)

(58) Field of Classification Search
CPC ...... G06F 1/1652; G06F 3/017; G06F 3/0412; G06F 3/0416; G06F 3/0482;
(Continued)

(56) References Cited

U.S. PATENT DOCUMENTS 8,723,824 B2    5/2014  Myers et al.
9,639,175 B2 *  5/2017  Cho ...................... G06F 1/1652
(Continued)

FOREIGN PATENT DOCUMENTS

CN    103105960 A    5/2013
CN    104657051 A    5/2015
(Continued)

OTHER PUBLICATIONS

European Search Report dated Aug. 13, 2018, issued in European Patent Application No. 16866531.3.
(Continued)

*Primary Examiner* — Premal R Patel
(74) *Attorney, Agent, or Firm* — Jefferson IP Law, LLP

(57) ABSTRACT

Provided are a method and an electronic apparatus for a touch input performed via an edge screen. The method includes: sensing a first touch with respect to a first edge screen and a second touch with respect to a second edge screen; determining a first location on the first edge screen, the first location corresponding to the first touch, and a second location on the second edge screen, the second location corresponding to the second touch; sensing a first gesture having the first location as a start point thereof and a second gesture having the second location as a start point thereof; and performing a pre-set operation of the electronic apparatus, based on a combination of the first gesture and the second gesture.

16 Claims, 17 Drawing Sheets

(51) Int. Cl.
*G06F 3/0482* (2013.01)
*G06F 1/16* (2006.01)
*G06F 3/01* (2006.01)
*G06F 3/041* (2006.01)

(52) U.S. Cl.
CPC .......... *G06F 3/0412* (2013.01); *G06F 3/0416* (2013.01); *G06F 3/0482* (2013.01); *G06F 3/0488* (2013.01); *G06F 3/04842* (2013.01); *G06F 3/04845* (2013.01); *G06F 3/04847* (2013.01); *G06F 3/04883* (2013.01); *G06F 3/04886* (2013.01); *G06F 2203/04104* (2013.01); *G06F 2203/04805* (2013.01); *G06F 2203/04806* (2013.01); *G06F 2203/04808* (2013.01)

(58) Field of Classification Search
CPC .......... G06F 3/04842; G06F 3/04845; G06F 3/04847; G06F 3/0488; G06F 3/04883; G06F 3/04886; G06F 2203/04104; G06F 2203/04805; G06F 2203/04806; G06F 2203/04808
See application file for complete search history.

(56) References Cited

U.S. PATENT DOCUMENTS

| | | | |
|---|---|---|---|
| 9,823,756 B2 | 11/2017 | Kwak et al. | |
| 9,990,125 B2 | 6/2018 | Jung et al. | |
| 2011/0083105 A1 | 4/2011 | Shin et al. | |
| 2011/0090155 A1 | 4/2011 | Caskey et al. | |
| 2011/0209100 A1* | 8/2011 | Hinckley | G06F 3/04883 715/863 |
| 2012/0098639 A1* | 4/2012 | Ijas | G06F 3/04883 340/5.51 |
| 2012/0159386 A1* | 6/2012 | Kang | G06F 3/0481 715/800 |
| 2012/0242602 A1 | 9/2012 | Choi | |
| 2013/0038552 A1* | 2/2013 | Chan | G06F 3/04883 345/173 |
| 2013/0076649 A1 | 3/2013 | Myers et al. | |
| 2013/0145311 A1* | 6/2013 | Joo | G06F 3/04886 715/788 |
| 2014/0168097 A1* | 6/2014 | Oh | G11B 27/005 345/173 |
| 2014/0215336 A1* | 7/2014 | Gardenfors | G06F 3/017 715/719 |
| 2014/0250398 A1* | 9/2014 | Andrews | G06F 3/04883 715/771 |
| 2014/0281964 A1* | 9/2014 | Han | G06F 3/016 715/708 |
| 2014/0351707 A1* | 11/2014 | Missig | G06F 3/04883 715/744 |
| 2014/0380247 A1* | 12/2014 | Tecarro | G06F 3/0483 715/863 |
| 2015/0015511 A1 | 1/2015 | Kwak et al. | |
| 2015/0026623 A1* | 1/2015 | Horne | G06F 1/1677 715/771 |
| 2015/0058733 A1* | 2/2015 | Novikoff | G11B 27/031 715/723 |
| 2015/0062053 A1 | 3/2015 | Wong et al. | |
| 2015/0121263 A1* | 4/2015 | Yeh | G06F 3/04817 715/765 |
| 2015/0143238 A1* | 5/2015 | Jung | G06F 3/04817 715/708 |
| 2015/0195789 A1* | 7/2015 | Yoon | G06F 3/0488 345/173 |
| 2015/0268789 A1 | 9/2015 | Liao et al. | |
| 2016/0063297 A1* | 3/2016 | Lee | G06K 9/00013 382/124 |
| 2017/0123590 A1* | 5/2017 | Han | G06F 3/0488 |
| 2017/0228066 A1* | 8/2017 | Chiang | G06F 3/044 |

FOREIGN PATENT DOCUMENTS

| | | |
|---|---|---|
| CN | 104883439 A | 9/2015 |
| CN | 104935738 A | 9/2015 |
| EP | 2 874 053 A2 | 5/2015 |
| KR | 10-2014-0048756 A | 4/2014 |
| KR | 10-2015-0007925 A | 1/2015 |
| KR | 10-2015-00047925 A | 1/2015 |
| KR | 10-1495967 A | 2/2015 |
| KR | 10-2015-0072940 A | 6/2015 |

OTHER PUBLICATIONS

European Search Report dated Dec. 3, 2020; European Appln. No. 16 866 531.3-1203.
Chinese Office Action with English translation dated Mar. 25, 2019; Chinese Appln. No. 201510788114.1.

* cited by examiner

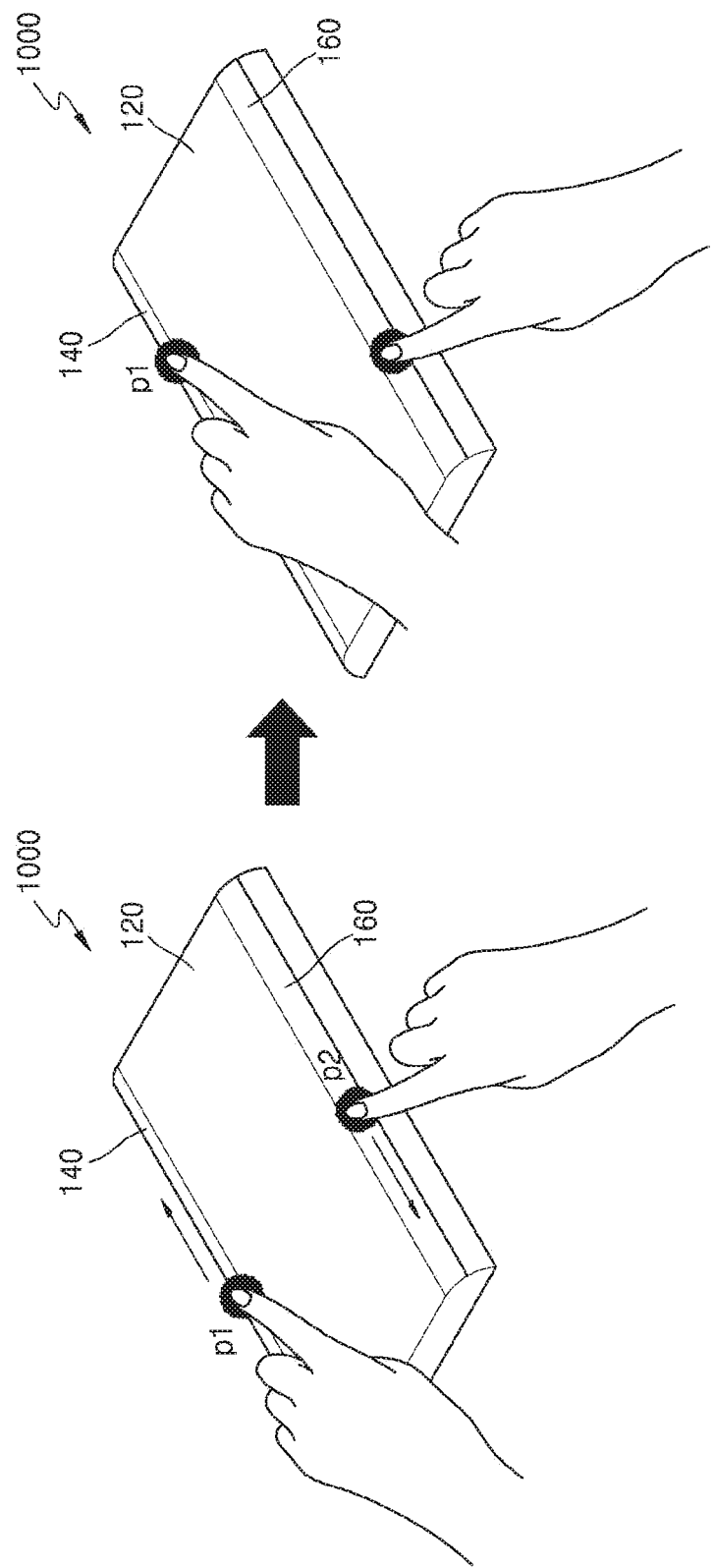

US 11,003,328 B2

TOUCH INPUT METHOD THROUGH EDGE SCREEN, AND ELECTRONIC DEVICE

TECHNICAL FIELD

The present disclosure relates to a technique of controlling an electronic apparatus, and more particularly, to a method and an electronic apparatus for performing a touch input via an edge screen.

BACKGROUND ART

Functions of electronic apparatuses have rapidly diversified with developments in science technology. Nowadays, electronic apparatuses have to perform various operations based on different operation commands. In order to improve use efficiency of electronic apparatuses, operation commands of the electronic apparatuses that are given by a user are required to be simplified.

According to the related art, when a user wants an electronic apparatus to execute a specific operation, complex and time-consuming processes are needed. For example, when a user wants to hide sensitive personal information, such as salary, bank transactions, authentication numbers, etc. in the electronic apparatus, the user first has to select information to hide and then select an operation to be executed on the selected information. As such, the user is inconvenienced by having to perform time-consuming operations in order to get the electronic apparatus to execute desired operations.

DESCRIPTION OF EMBODIMENTS

Technical Problem

According to an embodiment, a touch and a gesture are sensed in an edge screen so that an operation pre-set in an electronic apparatus is efficiently performed.

Solution to Problem

According to an aspect of the present disclosure, there is provided a method of controlling an electronic apparatus having a plurality of edge screens, the method including: sensing a first touch with respect to a first edge screen and a second touch with respect to a second edge screen; determining a first location on the first edge screen, the first location corresponding to the first touch, and a second location on the second edge screen, the second location corresponding to the second touch; sensing a first gesture having the first location as a start point thereof and a second gesture having the second location as a start point thereof; and performing a pre-set operation of the electronic apparatus, based on a combination of the first gesture and the second gesture.

BRIEF DESCRIPTION OF DRAWINGS

FIGS. 5A through 5D illustrate examples of a combination of a first gesture and a second gesture, in a method of controlling an electronic apparatus, according to an embodiment.

BEST MODE

Figure 1:
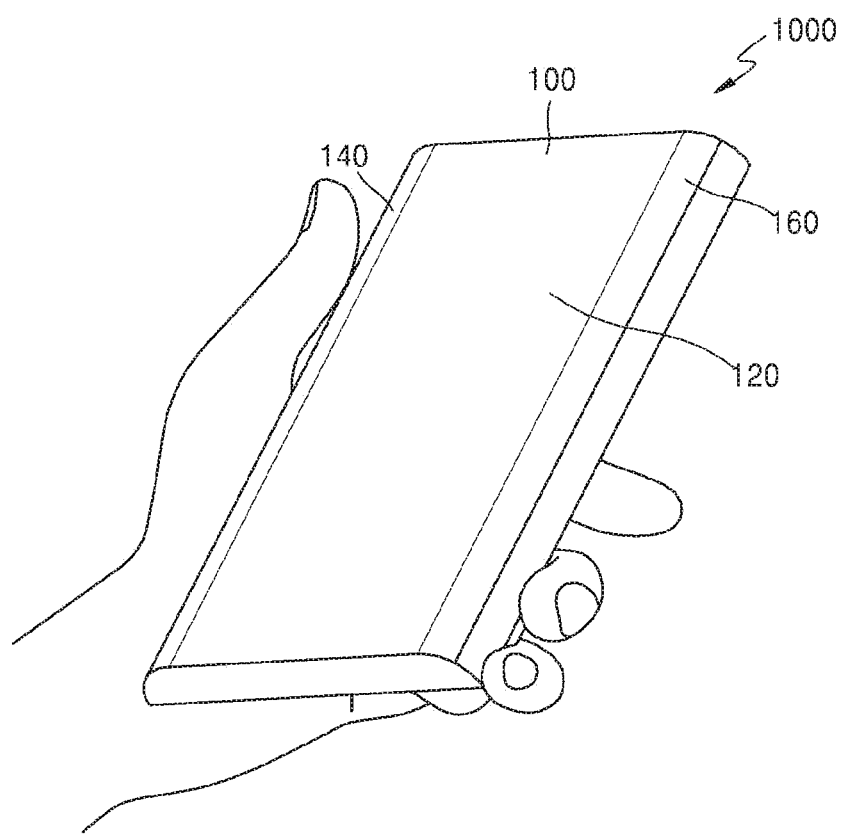
FIGS. 1 and 2 illustrate an example of an electronic apparatus according to an embodiment.

According to an aspect of the present disclosure, there is provided a method of controlling an electronic apparatus having a plurality of edge screens, the method including: sensing a first touch with respect to a first edge screen and a second touch with respect to a second edge screen; determining a first location on the first edge screen, the first location corresponding to the first touch, and a second location on the second edge screen, the second location corresponding to the second touch; sensing a first gesture having the first location as a start point thereof and a second gesture having the second location as a start point thereof; and performing a pre-set operation of the electronic apparatus, based on a combination of the first gesture and the second gesture.

The determining of the first location on the first edge screen, the first location corresponding to the first touch, and the second location on the second edge screen, the second location corresponding to the second touch, may include: determining the first location and the second location, when, while any one of the first touch and the second touch is being sensed, the other one of the first touch and the second touch is sensed.

The method may further include determining whether or not a relative relationship between the first location and the second location satisfies a pre-set condition.

The pre-set condition may include a case in which a distance between a first virtual line and a second virtual line is equal to or less than a pre-set critical value, wherein the first virtual line is, at the first location, perpendicular to the first edge screen, and the second virtual line is, at the second location, perpendicular to the second edge screen.

The first gesture may include at least one of clicking, sliding, and maintaining, and the second gesture may include at least one of clicking, sliding, and maintaining.

The sliding may include at least one of unidirectional straight line-type sliding, direction-conversional straight line-type sliding, and curved line-type sliding.

The performing of the pre-set operation of the electronic apparatus, based on the combination of the first gesture and the second gesture, may include: performing the pre-set operation, when, while any one of the first gesture and the second gesture is being sensed, the other one of the first gesture and the second gesture is sensed.

The performing of the pre-set operation of the electronic apparatus, based on the combination of the first gesture and the second gesture, may include: determining an application executed in the electronic apparatus; determining the pre-set operation with respect to the executed application, the pre-set operation corresponding to the combination of the first gesture and the second gesture; and performing the pre-set operation of the executed application, the pre-set operation corresponding to the combination of the first gesture and the second gesture.

The method may further include selecting an item corresponding to the first location and the second location, in an execution window of the application executed in the electronic apparatus, wherein the pre-set operation with respect to the executed application includes moving a display location of the selected item.

According to another aspect of the present disclosure, there is provided an electronic apparatus having a plurality of edge screens, the electronic apparatus including: a touch screen including a main screen and the plurality of edge screens; a memory storing at least one program; and at least one processor configured to execute the at least one program to cause the electronic apparatus to perform a pre-set operation, wherein the at least one program includes instructions to perform operations of: sensing a first touch with respect to a first edge screen and a second touch with respect to a second edge screen; determining a first location on the first edge screen, the first location corresponding to the first touch, and a second location on the second edge screen, the second location corresponding to the second touch; sensing a first gesture having the first location as a start point thereof and a second gesture having the second location as a start point thereof; and performing the pre-set operation of the electronic apparatus, based on a combination of the first gesture and the second gesture.

The at least one program may further include instructions to perform an operation of determining the first location and the second location, when, while any one of the first touch and the second touch is being sensed, the other one of the first touch and the second touch is sensed.

The at least one program may further include instructions to perform an operation of determining whether or not a relative relationship between the first location and the second location satisfies a pre-set condition.

The pre-set condition may include a case in which a distance between a first virtual line and a second virtual line is equal to or less than a pre-set critical value, wherein the first virtual line is, at the first location, perpendicular to the first edge screen, and the second virtual line is, at the second location, perpendicular to the second edge screen.

The first gesture may include at least one of clicking, sliding, and maintaining, and the second gesture may include at least one of clicking, sliding, and maintaining.

The sliding may include at least one of unidirectional straight line-type sliding, direction-conversional straight line-type sliding, and curved line-type sliding.

The at least one program may further include instructions to perform an operation of performing the pre-set operation, when, while any one of the first gesture and the second gesture is being sensed, the other one of the first gesture and the second gesture is sensed.

The at least one program may further include instructions to perform operations of: determining an application executed in the electronic apparatus; determining the pre-set operation with respect to the executed application, the pre-set operation corresponding to the combination of the first gesture and the second gesture; and performing the pre-set operation of the executed application, the pre-set operation corresponding to the combination of the first gesture and the second gesture.

The at least one program may further include instructions to perform an operation of selecting an item corresponding to the first location and the second location, in an execution window of the application executed in the electronic apparatus, wherein the pre-set operation with respect to the executed application includes moving a display location of the selected item.

According to another aspect of the present disclosure, there is provided a non-transitory computer-readable recording medium having embodied thereon a program for executing the method of controlling the electronic apparatus having the plurality of edge screens.

MODE OF DISCLOSURE

Hereinafter, embodiments of the present disclosure will be described in detail with reference to the accompanying drawings to fully convey the concept of the disclosure to one of ordinary skill in the art. The disclosure may, however, be embodied in many different forms and should not be construed as being limited to the embodiments set forth herein. In the drawings, like reference numerals denote like elements. Also, while describing the present disclosure, detailed descriptions about related well known functions or configurations that may blur the points of the present disclosure are omitted.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Hereinafter, the present disclosure will be described in detail by referring to the accompanying drawings.

Figure 2:
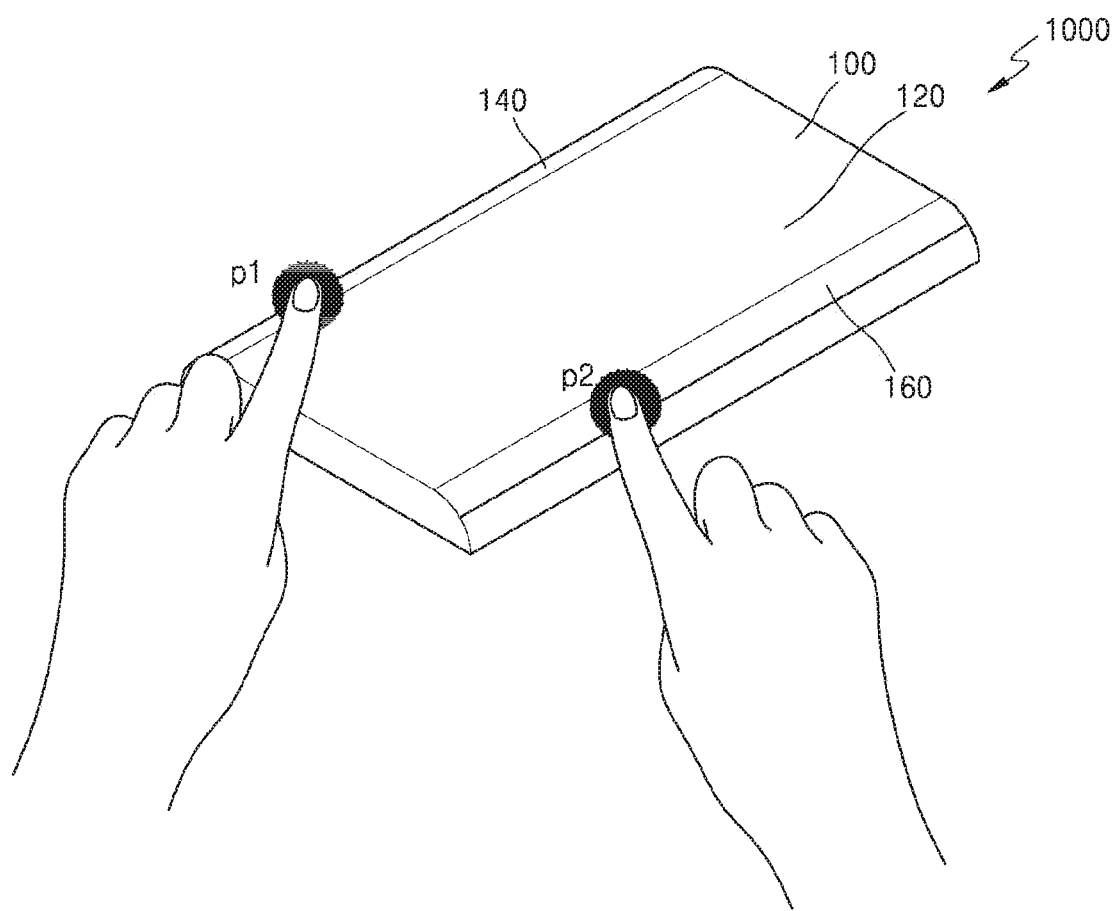

FIGS. 1 and 2 illustrate an example of an electronic apparatus 1000 according to an embodiment.

As illustrated in FIG. 1, the electronic apparatus 1000 according to an embodiment may perform a specific operation when a touch and a specific gesture of a user are sensed on edge screens 140 and 160 at both sides of a touch screen 100.

The electronic apparatus 1000 may refer to an electronic apparatus configured to provide specific information to a user. For example, the electronic apparatus 1000 may include smartphones, laptop computers, tablet personal computers (PCs), game consoles, personal digital assistants (PDAs), digital multimedia players (DMPs), etc. However, the electronic apparatus 1000 is not limited thereto, and may include various touch screen electronic apparatuses.

As illustrated in FIG. 2, the electronic apparatus 1000 according to an embodiment may include the touch screen 100 configured to provide specific information to a user, and the touch screen 100 may include a main screen 120 at a front side, and the plurality of edge screens 140 and 160 provided at both sides of the main screen 120.

The main screen 120 and the plurality of edge screens 140 and 160 may be physically separated from each other. However, it is not limited thereto. A central portion of the touch screen 100, which is physically a single unit, may be designated as the main screen 120, and both side portions of the touch screen 100 may be designated as the edge screens 140 and 160.

The edge screens 140 and 160 may be provided as flat surfaces on the same plane as the main screen 120.

Alternatively, the edge screens 140 and 160 may be provided on a different plane from the main screen 120. In this case, the edge screens 140 and 160 may be provided as flat surfaces or curved surfaces.

The edge screens 140 and 160 may be provided in a direction parallel to an edge of the electronic apparatus 1000. The edge screens 140 and 160 may be provided at both edges of the electronic apparatus 1000, or at upper and lower and right and left edges of the electronic apparatus 1000.

When the edge screens 140 and 160 are provided at both edges of the electronic apparatus 1000, the edge screens 140 and 160 may include the first edge screen 140 provided at an edge of the main screen 120 and the second edge screen 160 provided at another edge of the main screen 120, the other edge facing the edge.

Any one of directions parallel to both edges of the main screen 120, at which the edge screens 140 and 160 are provided, may be defined as a first direction, and a direction opposite to the first direction may be defined as a second direction. In this case, the first direction may be defined as an upper direction and the second direction may be defined as a lower direction.

The touch screen 100 of the electronic apparatus 1000 may display an execution window of an application executed in the electronic apparatus 1000. The execution window may denote a screen displayed on the touch screen 100 when the application is executed.

The execution window of the application may be displayed on all of the main screen 120 and the edge screens 140 and 160, or may be displayed on the main screen 120 or on the edge screens 140 and 160.

The electronic apparatus 1000 may display specific information for a user or receive specific information from the user, via the execution window of the application.

Hereinafter, in this specification, the present disclosure will be described with reference to the electronic apparatus 1000 illustrated in FIG. 2 according to an embodiment.

Figure 3:
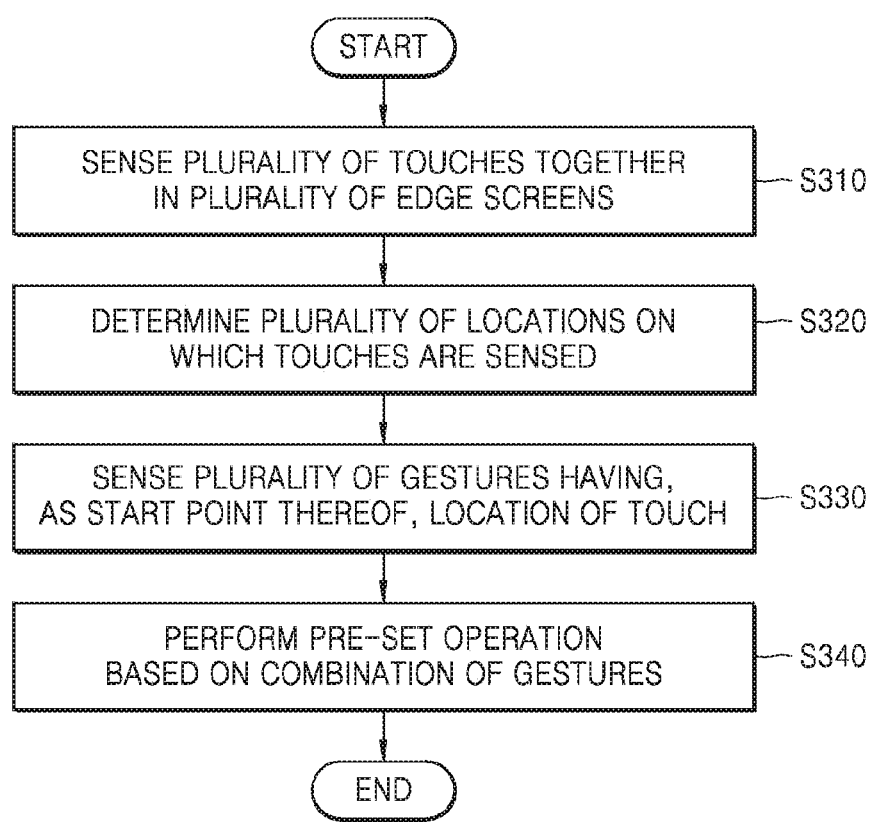
FIG. 3 is a flowchart of a method of controlling an electronic apparatus having edge screens at both sides thereof, according to an embodiment.

FIG. 3 is a flowchart of a method of controlling the electronic apparatus 1000 having the edge screens 140 and 160 at both sides thereof, according to an embodiment. In FIG. 3, the electronic apparatus 1000 may perform a pre-set operation based on a touch input with respect to the plurality of edge screens 140 and 160.

Referring to FIG. 3, in operation S310, the electronic apparatus 1000 may sense a plurality of touches with respect to the plurality of edge screens 140 and 160. When a user physically contacts the touch screen 100, the electronic apparatus 1000 may sense the physical contact of the user based on pressure or electricity, so as to determine whether or not a touch is generated.

The electronic apparatus 1000 may sense a touch using fingers of both hands of a user. For example, the electronic apparatus 1000 may sense the touch using an index finger of one hand and an index finger of the other hand of the user.

Also, the electronic apparatus 1000 may sense a touch using two fingers of one hand of a user. For example, the electronic apparatus 1000 may sense the touch using a thumb of one hand and an index finger of the same hand of the user.

The electronic apparatus 1000 may sense a touch using an input device, such as a pen, in addition to the touch using the finger of the user.

The electronic apparatus 1000 may sense a touch with respect to the first edge screen 140 as a first touch and a touch with respect to the second edge screen 160 as a second touch.

The electronic apparatus 1000 may perform various pre-set operations when the first touch and the second touch are simultaneously sensed.

Here, the case in which "the first touch and the second touch are simultaneously sensed" may include not only a case in which a start time of the first touch and a start time of the second touch perfectly correspond to each other, but also a case in which while any one of the first touch and the second touch is being continually sensed, the other one is sensed.

Also, the case in which "the first touch and the second touch are simultaneously sensed" may include a case in which there exists a temporal section in which the first touch and the second touch are sensed together in the electronic apparatus 1000.

When, while any one of the first touch and the second touch is being continually sensed, the other one is sensed, the electronic apparatus 1000 may determine a first location and a second location.

In operation S320, the electronic apparatus 1000 may determine, on the touch screen 100, locations in which the touches of the user are sensed.

The electronic apparatus 1000 may determine a location of the first touch sensed at the first edge screen 140 as a first location p1, and a location of the second touch sensed at the second edge screen 160 as a second location p2.

Figure 4A:
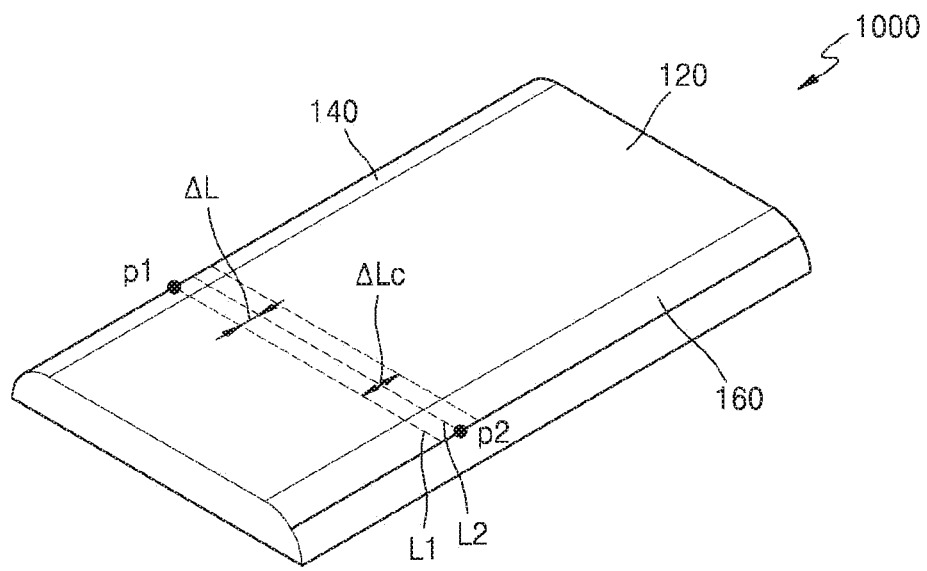
FIGS. 4A and 4B illustrate examples of a relative relationship between a first location and a second location and a pre-set condition, in a method of controlling an electronic apparatus, according to an embodiment.
Figure 4B:
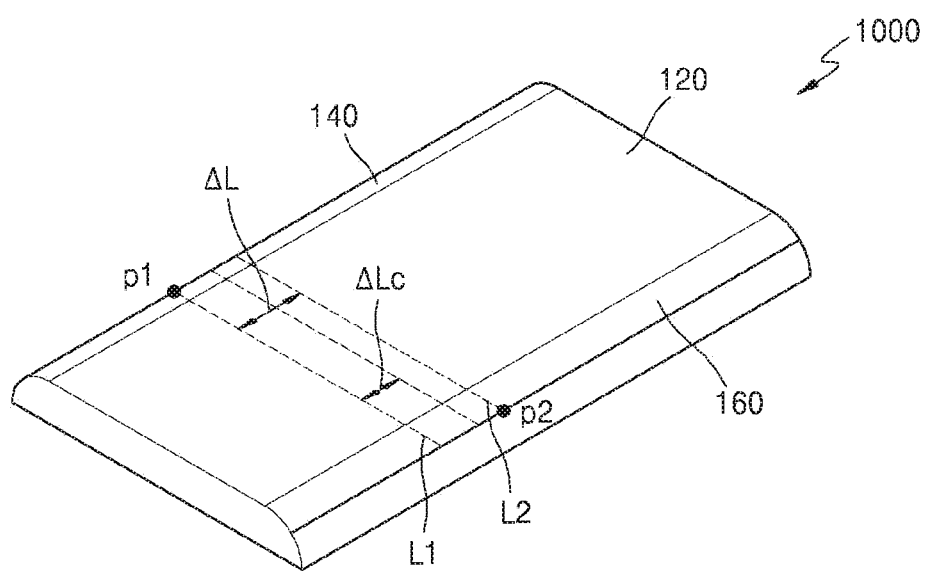
Figure 5A:
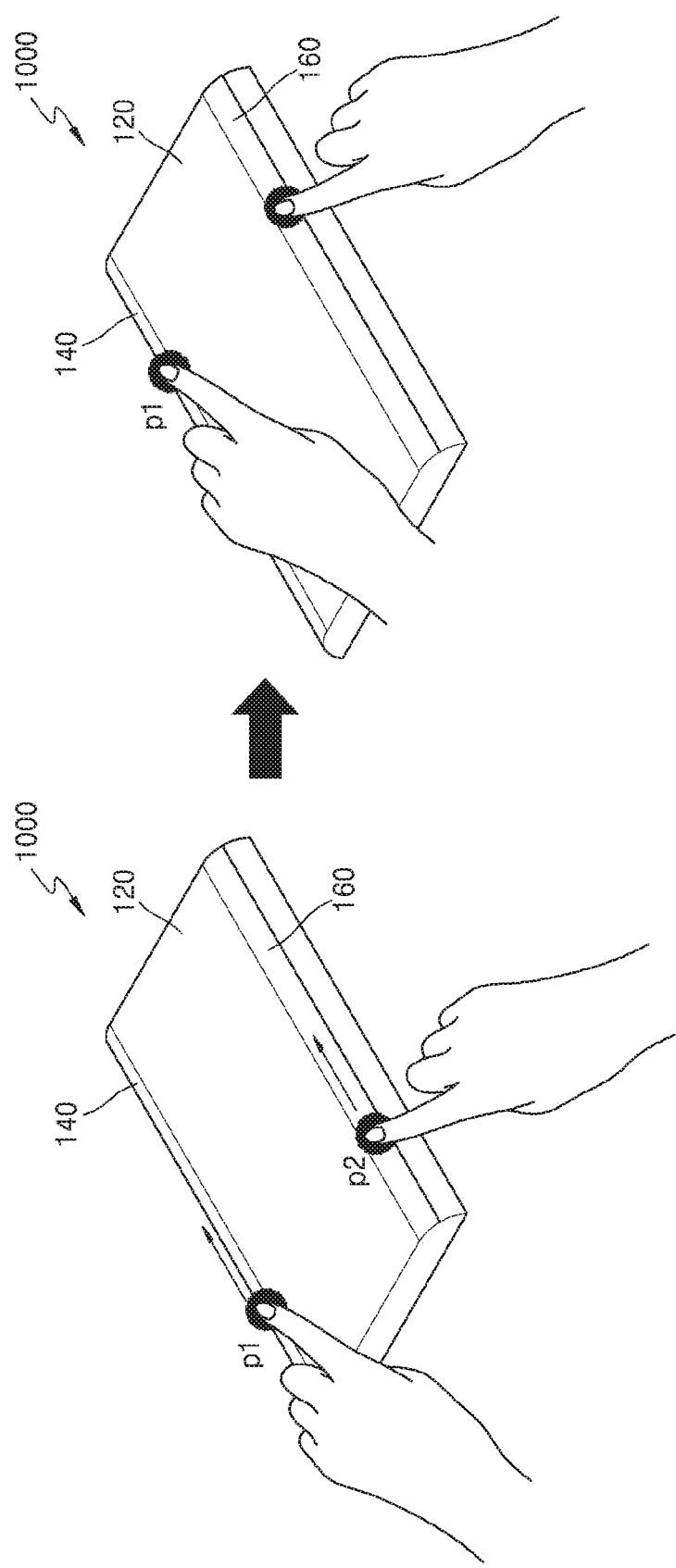
Figure 5B:
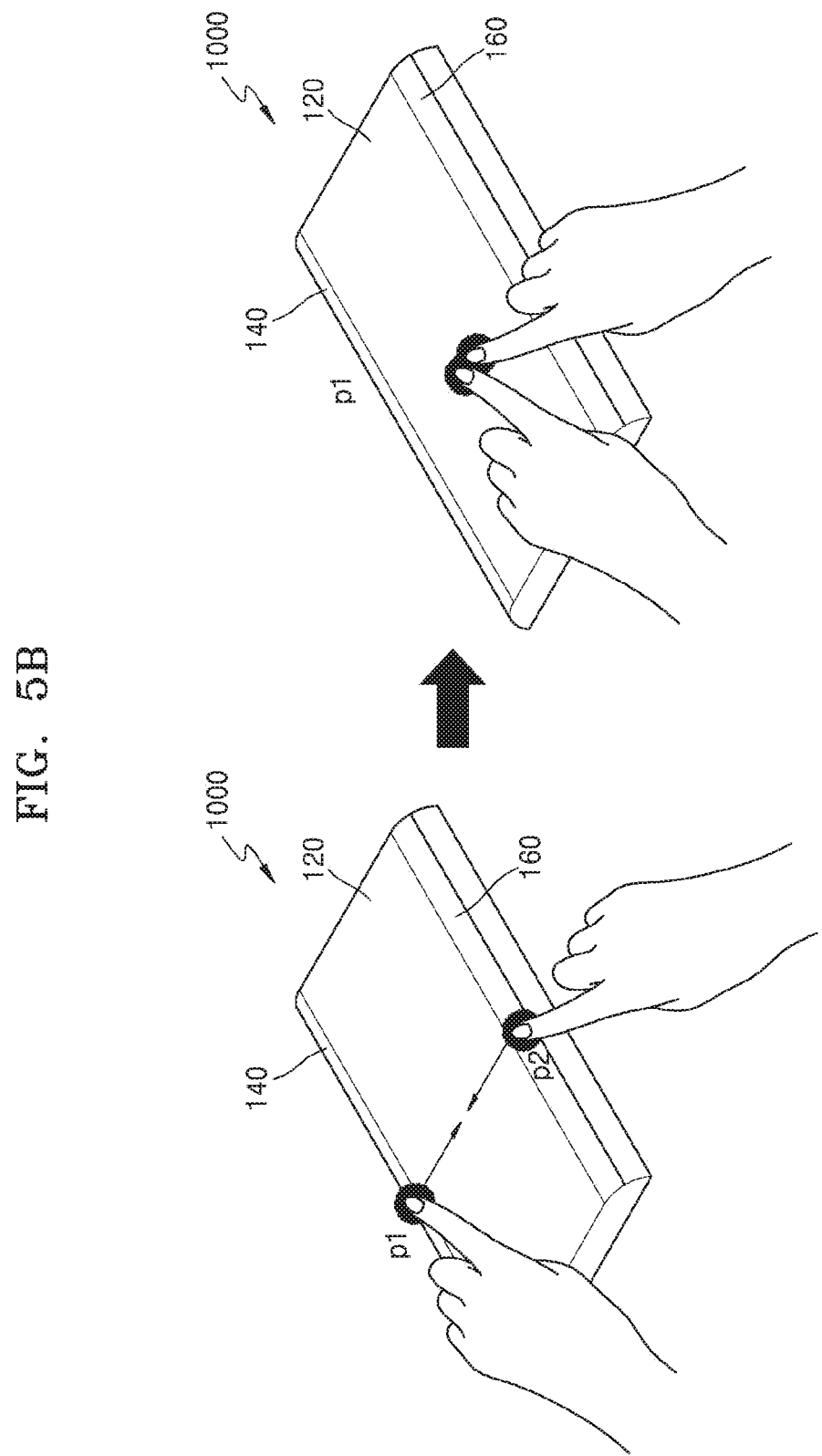
Figure 5C:
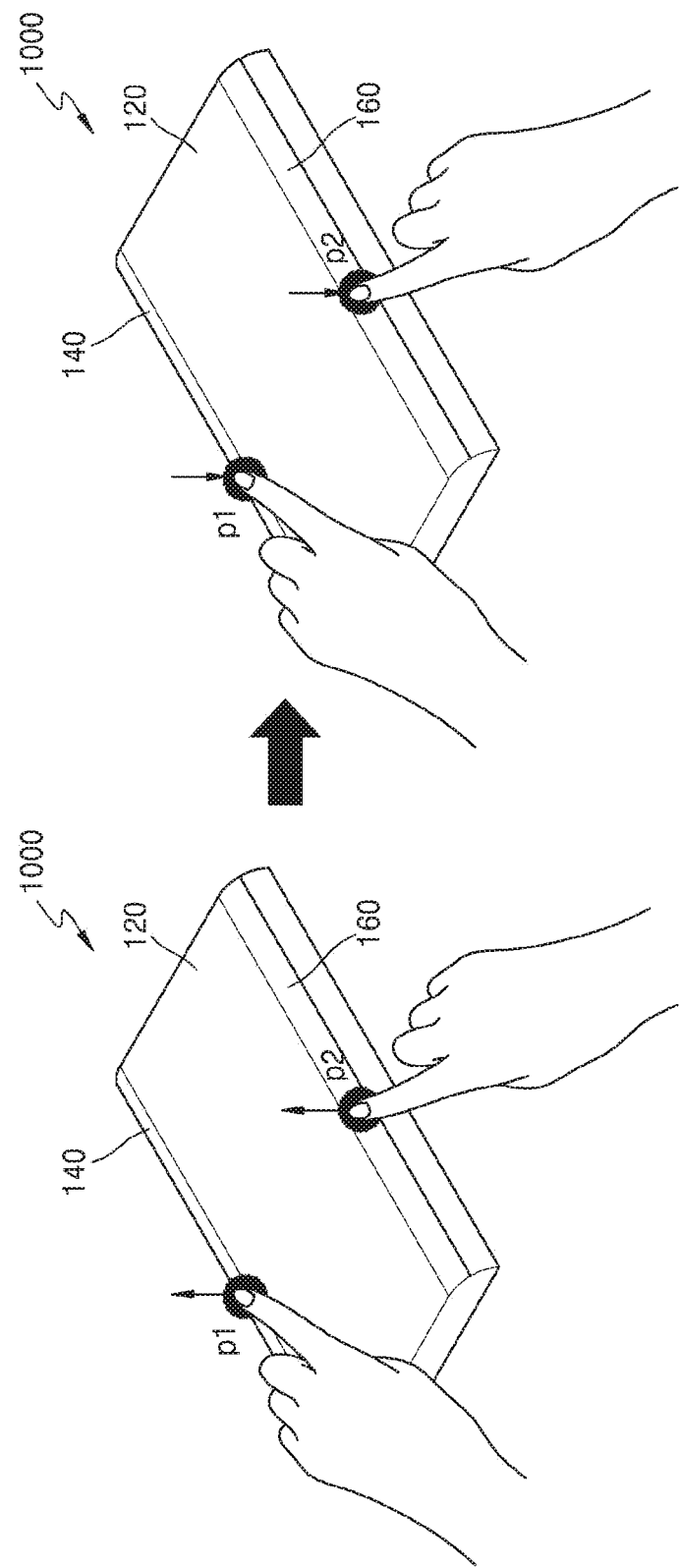

FIGS. 4A and 4B illustrate examples of a relative relationship between the first location p1 and the second location p2 and a pre-set condition, in a method of controlling the electronic apparatus 1000, according to an embodiment.

Selectively, the method of controlling the electronic apparatus 1000 according to an embodiment may include, between operation S320 and operation S330, determining whether or not the relative relationship between the first location p1 and the second location p2 satisfies a pre-set condition.

When the relative relationship between the first location p1 and the second location p2 satisfies the pre-set condition, the electronic apparatus 1000 may determine that the first location p1 and the second location p2 are within substantially the same level. When the relative relationship between the first location p1 and the second location p2 does not satisfy the pre-set condition, the electronic apparatus 1000 may determine that the first location p1 and the second location p2 are at different levels.

Referring to FIG. 4A, that the pre-set condition is satisfied may denote a case in which a vertical distance ΔL between a first virtual line L1 and a second virtual line L2 is equal to or less than a pre-set critical value ΔLc, wherein the first virtual line L1 is drawn from the first location p1 as a start point in a direction perpendicular to the first edge screen 140 at which the first location p1 is sensed, and the second virtual line L2 is drawn from the second location p2 as a start point in a direction perpendicular to the second edge screen 160 at which the second location p2 is sensed.

In this case, when the vertical distance ΔL between the first virtual line L1 and the second virtual line L2 is equal to or less than the pre-set critical value ΔLc as illustrated in FIG. 4A, it may be determined that the relative relationship between the first location p1 and the second location p2 corresponds to substantially the same level. When the relative relationship between the first location p1 and the second location p2 corresponds to substantially the same level, it may denote that the first touch on the first edge screen 140 and the second touch on the second edge screen 160 via the user are performed at substantially the same distance from an edge of the electronic apparatus 1000.

However, when the vertical distance ΔL between the first virtual line L1 and the second virtual line L2 is greater than the pre-set critical value ΔLc as illustrated in FIG. 4B, it may be determined that the relative relationship between the first location p1 and the second location p2 corresponds to the different level. When the relative relationship between the first location p1 and the second location p2 corresponds to the different level, it may denote that the first touch on the first edge screen 140 and the second touch on the second edge screen 160 via the user are performed at different distances from an edge of the electronic apparatus 1000.

Meanwhile, based on the first location p1 and the second location p2, a selected area on the touch screen 100 of the electronic apparatus 1000 may be determined. The selected area may denote an area between the first virtual line L1 and the second virtual line L2. The selected area may be associated with selection of items, portions to be enlarged, etc. Detailed descriptions with respect to this aspect will be given below.

Referring to FIG. 3 again, in operation S330, the electronic apparatus 1000 may sense a user gesture having, as a start point thereof, a location on the touch screen 100, at which the touch of the user is sensed.

The user gesture denotes a user motion sensed on the touch screen 100, and may include sliding, clicking, and maintaining.

The sliding may denote a motion in which a user moves from the start point, which is the location that the user touches, to a different location, while maintaining the touch on the touch screen 100. Examples of sliding may include unidirectional straight line-type sliding, direction-conversional straight line-type sliding, curved line-type sliding, etc.

The clicking may denote a motion in which a user releases a touch on the start point, which is the location on the touch screen that the user touches, and then re-touches the start point. Examples of clicking may include single clicking, double clicking, tripe clicking, etc.

The maintaining may denote a motion in which a user maintains a touch on the start point, which is the location that the user touches, for a period of time equal to or greater than a pre-set period of time.

The electronic apparatus 1000 may sense a gesture using fingers of both hands of a user. For example, the electronic apparatus 1000 may sense the gesture using an index finger of one hand and an index finger of the other hand of the user.

Also, the electronic apparatus 1000 may sense a gesture using two fingers of one hand of a user. For example, the electronic apparatus 1000 may sense the gesture using a thumb and an index finger of one hand of the user.

The electronic apparatus 1000 may sense a gesture using an input device, such as a pen, in addition to the gesture using the finger of the user.

The electronic apparatus 1000 may sense a first gesture having the first location p1 as the start point, and a second gesture having the second location p2 as the start point.

For example, the first gesture may include any one of sliding, clicking, and maintaining, and the second gesture may include any one of sliding, clicking, and maintaining. However, the first gesture and the second gesture are not limited thereto.

In this case, the electronic apparatus 1000 may sense a combination of the first gesture and the second gesture. For example, the electronic apparatus 1000 may sense the first gesture, which is sliding, and the second gesture, which is clicking.

According to the method of controlling the electronic apparatus 1000 according to an embodiment, the first gesture and the second gesture may be sensed only when the first touch and the second touch are simultaneously sensed.

Also, the electronic apparatus 1000 may perform a plurality of pre-set operations that are to be described below, when the first gesture and the second gesture are simultaneously sensed.

Here, the case in which "the first gesture and the second gesture are simultaneously sensed" may include not only a case in which a start time of the first gesture and a start time of the second gesture perfectly correspond to each other, but also a case in which while any one of the first gesture and the second gesture is being sensed, the other one is sensed.

Also, the case in which "the first gesture and the second gesture are simultaneously sensed" may include a case in which there exists a temporal section in which the first gesture and the second gesture are simultaneously sensed in the electronic apparatus 1000.

Also, the method of controlling the electronic apparatus 1000 according to an embodiment may include operation S330 of sensing the first gesture and the second gesture when the relative relationship between the first location p1 and the second location p2 corresponds to substantially the same level.

Also, when the relative relationship between the first location p1 and the second location p2 corresponds to the different level, the first gesture and the second gesture may not be sensed. However, the present disclosure is not limited thereto.

In operation S340, the electronic apparatus 1000 may perform the pre-set operation based on the combination of the first gesture and the second gesture.

In this case, the method of controlling the electronic apparatus 1000 according to an embodiment may include performing the pre-set operation only based on the combination of the first and second gestures, rather than the single first gesture or the single second gesture.

The pre-set operation may be determined based on a corresponsive relationship between a plurality of combinations of the first and second gestures and a plurality of operations of the electronic apparatus 1000.

The corresponsive relationship between the plurality of combinations of the first and second gestures and the plurality of operations of the electronic apparatus 1000 may be pre-set by pairing the plurality of combinations of the first and second gestures with the plurality of operations of the electronic apparatus 1000, respectively.

In detail, the corresponsive relationship between the plurality of combinations of the first and second gestures and the plurality of operations of the electronic apparatus 1000 may be pre-set and stored in the electronic apparatus 1000.

In operation S340, after the combination of the first and second gestures may be determined, the pre-set operation corresponding to the combination of the first and second gestures may be searched for based on the corresponsive relationship between the combinations of the first and second gestures and the operations of the electronic apparatus 1000.

FIGS. 5A through 5D illustrate examples of the combination of the first and second gestures, in a method of controlling the electronic apparatus 1000, according to an embodiment.

Referring to FIGS. 5A through 5D, the combination of the first and second gestures may include at least one of the following combinations: i) a combination of the first gesture of sliding from the first location p1 as a start point in a first direction of the first edge screen 140 and the second gesture of sliding from the second location p2 as a start point in a first direction of the second edge screen 160; ii) a combination of the first gesture of sliding from the first location p1 as a start point toward an inner side of the touch screen 100 and the second gesture of sliding from the second location p2 as a start point toward the inner side of the touch screen 100; iii) a combination of the first gesture of clicking on the first location p1 and the second gesture of clicking on the second location p2; and iv) a combination of the first gesture of sliding from the first location p1 as a start point in the first direction of the first edge screen 140 and the second gesture of sliding from the second location p2 as a start point in a second direction of the second edge screen 160.

Figure 6:
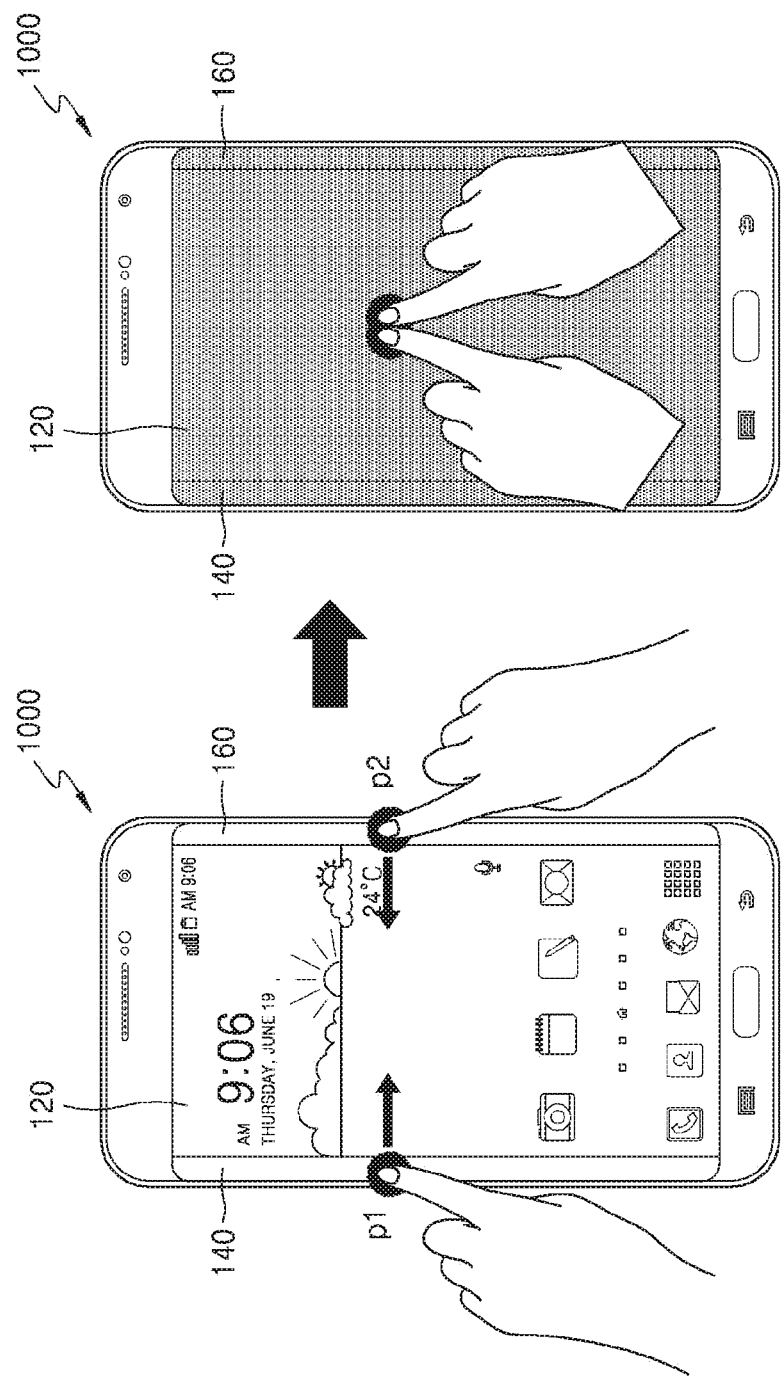
FIG. 6 illustrates an example of performing a pre-set operation corresponding to a combination of a first gesture and a second gesture, in a method of controlling an electronic apparatus, according to an embodiment.

FIG. 6 illustrates an example of performing the pre-set operation corresponding to the combination of the first gesture and the second gesture, in a method of controlling the electronic apparatus 1000, according to an embodiment.

When the combination of the first and second gestures is, for example, the combination of the first gesture of sliding from the first location p1 as the start point toward the inner side of the touch screen 100 and the second gesture of sliding from the second location p2 as the start point toward the inner side of the touch screen 100, the touch screen 100 of the electronic apparatus 1000 may be turned off. That the touch screen 100 is turned off may denote that the touch screen 100 is inactivated. In this case, the electronic apparatus 1000 may not need to determine an application executed in the foreground.

In this case, a user may not need to perform an operation of pressing a power button to turn off the touch screen 100 of the electronic apparatus 1000, and may quickly turn off the touch screen 100 of the electronic apparatus 1000, based on the combination of the first and second gestures. Via this, the user may achieve the reduction of power consumption and may effectively prevent people around the user from peeking at the content displayed on the electronic apparatus 1000.

Figure 7:
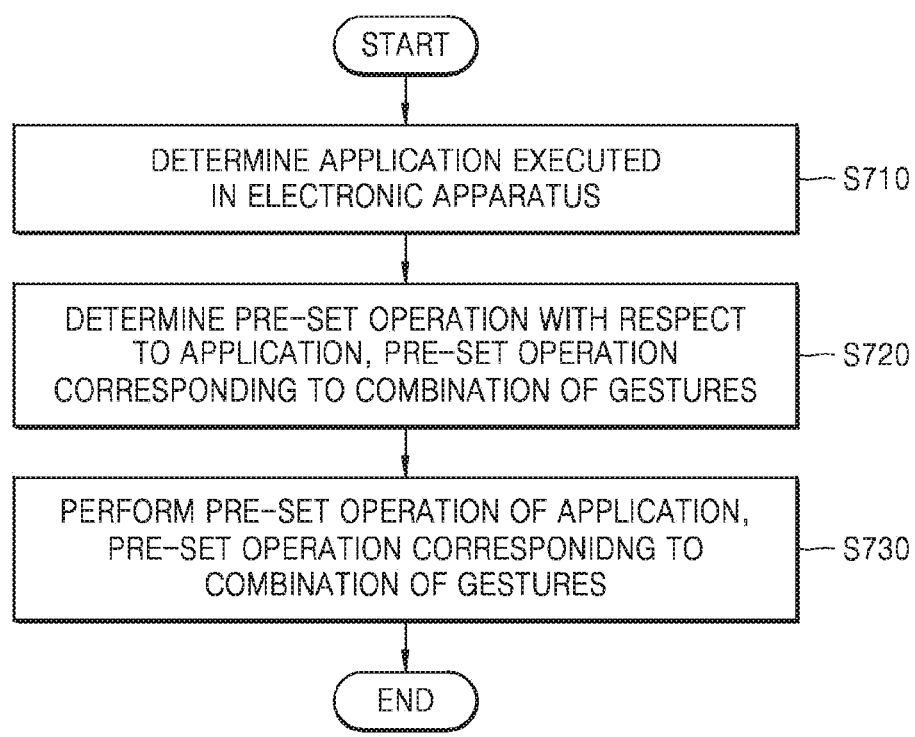
FIG. 7 is a flowchart of a method of performing a pre-set operation based on a combination of sensed gestures, via an electronic apparatus, according to an embodiment.

FIG. 7 is a flowchart of a method performed by the electronic apparatus 1000 to perform the pre-set operation based on the combination of sensed gestures, according to an embodiment.

According to the method of controlling the electronic apparatus 1000 according to an embodiment, the electronic apparatus 1000 may perform the pre-set operation with respect to an application that is executed. In this case, the electronic apparatus 1000 may perform the pre-set operation with respect to the application, based on the combination of the first and second gestures.

The operation of performing the pre-set operation with respect to the executed application based on the combination of the first and second gestures, via the electronic apparatus 1000, will be described in detail with reference to FIG. 7.

In operation S710, the electronic apparatus 1000 may determine the application that is executed in the electronic apparatus 1000. The electronic apparatus 1000 may determine the application, of which an execution window is displayed on the touch screen 100, from among applications that are currently executed.

In operation S720, the electronic apparatus 1000 may determine the pre-set operation with respect to the application, the pre-set operation corresponding to the combination of the first and second gestures.

The pre-set operation corresponding to the combination of the first and second gestures may be differently set for each application in the electronic apparatus 1000. The combination of the first and second gestures may correspond to different operations in the electronic apparatus 1000, based on different applications.

A corresponsive relationship between the plurality of combinations of the first and second gestures and the plurality of operations may be pre-set in the electronic apparatus 1000, based on each application.

When the executed application is determined, the electronic apparatus 1000 may determine the pre-set operation of the executed application, the pre-set operation corresponding to the combination of the first and second gestures.

In operation S730, the electronic apparatus 1000 may perform the pre-set operation of the executed application corresponding to the combination of the first and second gestures.

Figure 8:
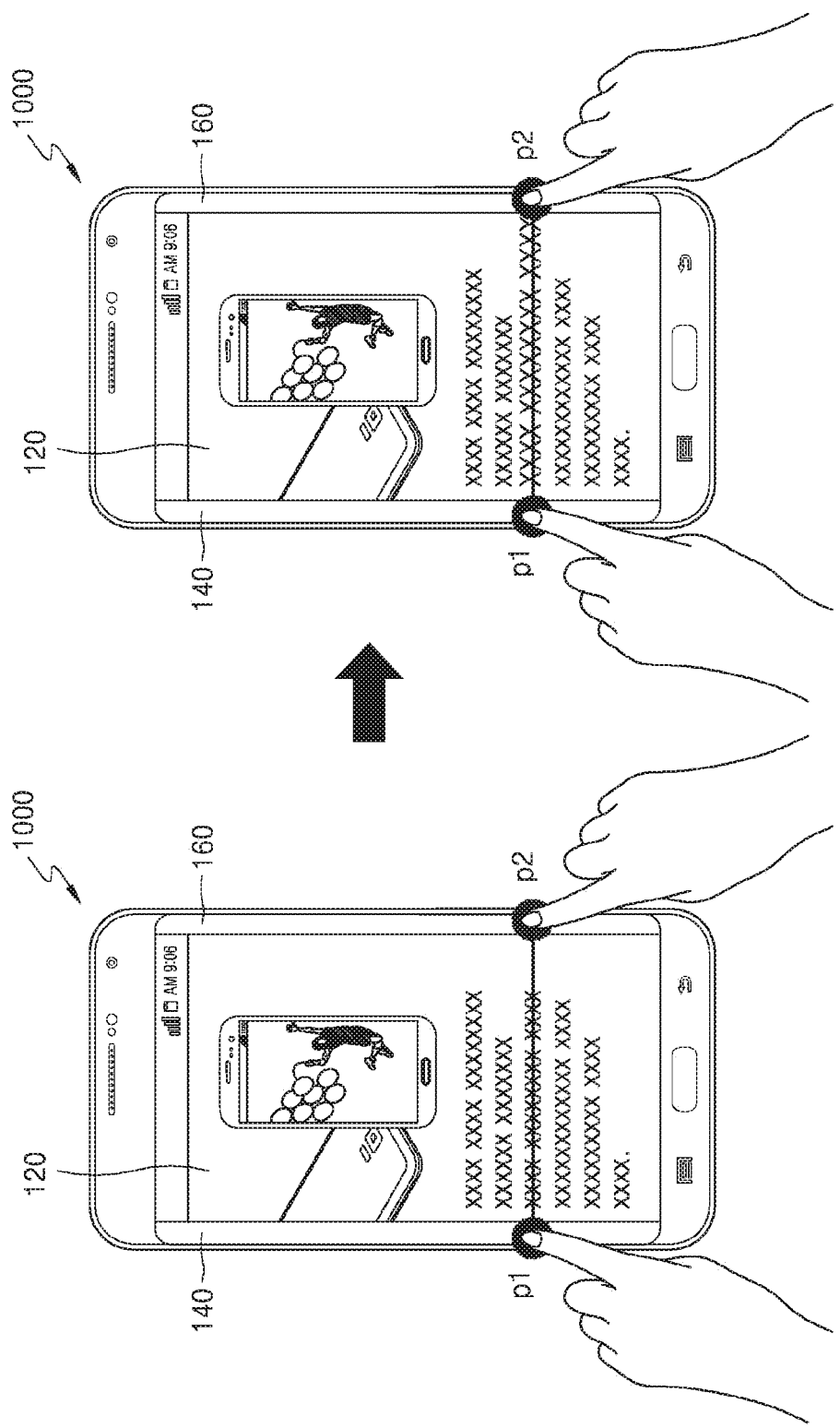
FIG. 8 illustrates an example of performing a pre-set operation corresponding to a combination of a first gesture and a second gesture, in a method of controlling an electronic apparatus, according to an embodiment.

FIG. 8 illustrates an example of performing the pre-set operation corresponding to the combination of the first and second gestures, in a method of controlling the electronic apparatus 1000, according to an embodiment.

Referring to FIG. 8, the pre-set operation corresponding to the combination of the first and second gestures may be an operation of enlarging a display size of content displayed on the touch screen 100 of the electronic apparatus 1000, the content being displayed via the application executed in the electronic apparatus 1000.

When the electronic apparatus 1000 senses the combination of the first gesture of clicking on the first location p1 and the second gesture of clicking on the second location p2, the display size of the content displayed, via the application, on the touch screen 100 of the electronic apparatus 1000 may be enlarged.

In this case, the pre-set operation may be to enlarge the content displayed in the execution window via the application, rather than the execution window of the application.

Also, referring to FIG. 8, the application executed in the electronic apparatus 1000 may be a web-browser application.

The electronic apparatus 1000 may receive simultaneous touch operations of the clicking input on the first location p1 and the clicking input on the second location p2, as the combination of the first and second gestures.

In this case, the pre-set operation corresponding to the combination of the first and second gestures may be to enlarge the display size of the content displayed in an execution window of the web-browser application, as illustrated in FIG. 8.

The electronic apparatus 1000 may enlarge the size of a piece of text displayed on a selected area based on the first location p1 and the second location p2 corresponding to substantially the same level, from among pieces of text displayed in a web-page.

Figure 9:
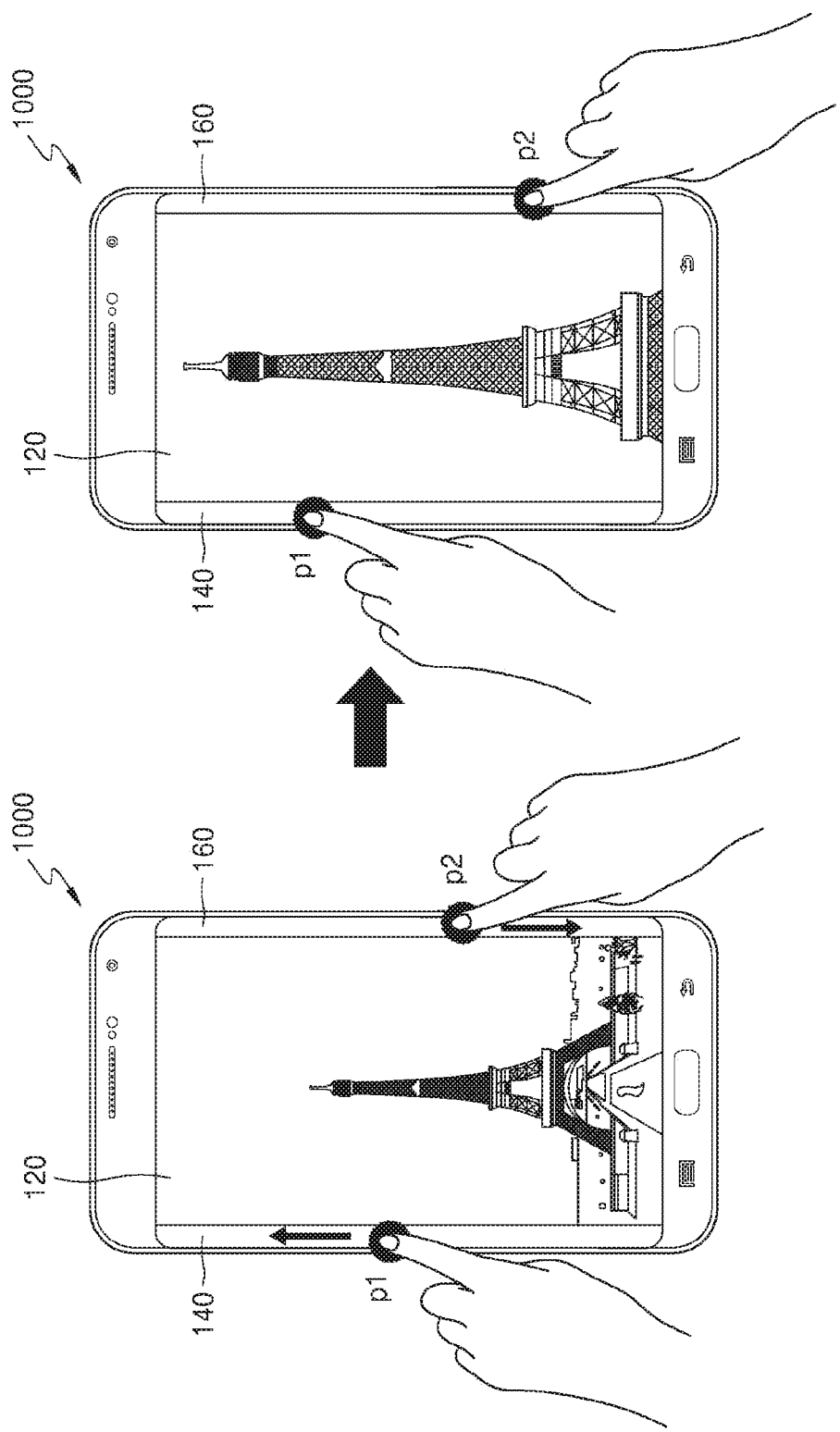
FIG. 9 illustrates an example of performing a pre-set operation corresponding to a combination of a first gesture and a second gesture, in a method of controlling an electronic apparatus, according to an embodiment.

FIG. 9 illustrates an example of performing the pre-set operation based on the combination of the first and second gestures, in a method of controlling the electronic apparatus 1000, according to an embodiment.

Referring to FIG. 9, the electronic apparatus 1000 may sense the combination of the first gesture of sliding from the first location p1 as the start point in the first direction of the first edge screen 140 and the second gesture of sliding from the second location p2 as the start point in the second direction of the second edge screen 160.

In this case, the electronic apparatus 1000 may determine an application configured to display an image on the touch screen 100, as the application that is executed.

The pre-set operation corresponding to the combination of the first and second gestures may be an operation of enlarging a display size of the image displayed on the touch screen 100 of the electronic apparatus, the image being displayed via the application executed in the electronic apparatus 1000.

The electronic apparatus 1000 may enlarge a selected area of the image displayed on the touch screen 100, the selected area being based on the first location p1 and the second location p2, to a selected area based on a touch end point of the first gesture on the first edge screen 140 and a touch end point of the second gesture on the second edge screen 160. The selected area may denote an area between the first virtual line L1 and the second virtual line L2 on the touch screen 100.

Figure 10:
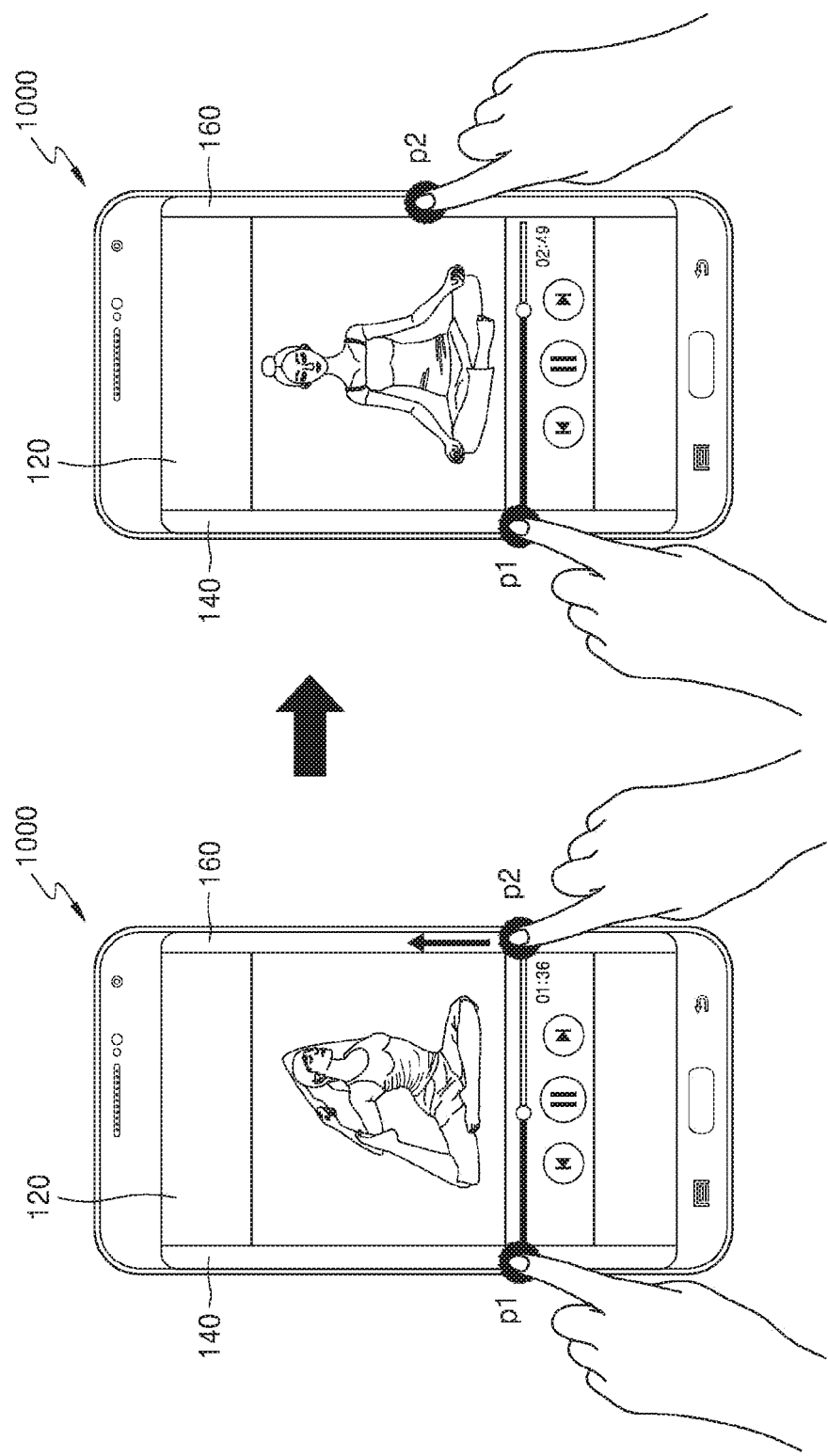
FIG. 10 illustrates an example of performing a pre-set operation corresponding to a combination of a first gesture and a second gesture, in a method of controlling an electronic apparatus, according to an embodiment.

FIG. 10 illustrates an example of performing the pre-set operation based on the combination of the first and second gestures, in a method of controlling the electronic apparatus 1000, according to an embodiment.

Referring to FIG. 10, the electronic apparatus 1000 may sense the combination of the first gesture of maintaining a touch input on the first location p1 and the second gesture of sliding from the second location p2 as the start point in the first direction of the second edge screen 160.

In this case, the electronic apparatus 1000 may determine an application configured to reproduce a video on the touch screen 100, as the application that is executed. The electronic apparatus 1000 may reproduce the video via the application sensed on the touch screen 100.

At a lower end of the video that is reproduced, a bar indicating the total reproduction time of the video may be displayed. Also, an object indicating a current reproduction point may be displayed on the bar.

The pre-set operation corresponding to the combination of the first and second gestures may be an operation of moving a reproduction point of the video reproduced on the touch screen 100 of the electronic apparatus 1000, the video being reproduced via the application executed in the electronic apparatus 1000.

The electronic apparatus 1000 may move a button of the current reproduction point of the video reproduced on the touch screen 100 in a first direction, such that a ratio of a moving distance of the second gesture to the total length of the second edge screen 160 is equal to a ratio of a moving distance of the button of the current reproduction point to the total length of the lower end bar.

In this case, a start point of the moved reproduction point may be the current reproduction point of the video. Also, when the sliding direction of the second gesture is the first direction, the current reproduction point may be moved forwards, and when the sliding direction of the second gesture is a second direction, the current reproduction point may be moved backwards.

Although not shown, the electronic apparatus 1000 may sense the combination of the first gesture of sliding from the first location p1 as the start point in the first direction of the first edge screen 140 and the second gesture of maintaining a touch input on the second location p2.

In this case, the electronic apparatus 1000 may determine an application configured to reproduce a video on the touch screen 100, as the application that is executed. The electronic apparatus 1000 may reproduce the video via the application sensed on the touch screen 100.

At an upper end of the video that is reproduced, a bar indicating an available range of reproduction volumes of the video may be displayed. Also, an object indicating a current reproduction volume may be displayed on the bar.

The pre-set operation corresponding to the combination of the first and second gestures may be an operation of changing the reproduction volume of the video reproduced on the touch screen 100 of the electronic apparatus 1000, the video being reproduced via the application executed in the electronic apparatus 1000.

The electronic apparatus 1000 may move a button of the current reproduction volume of the reproduced video, such that a ratio of a moving distance of the first gesture to the total length of the first edge screen 140 is equal to a ratio of a moving distance of the button of the current reproduction volume to the total length of the upper end bar.

In this case, a start point of the changed reproduction volume may be the current reproduction volume of the video. Also, when the sliding direction of the first gesture is a first direction, the reproduction volume may be increased, and when the sliding direction of the first gesture is a second direction, the reproduction volume may be decreased.

Figure 11:
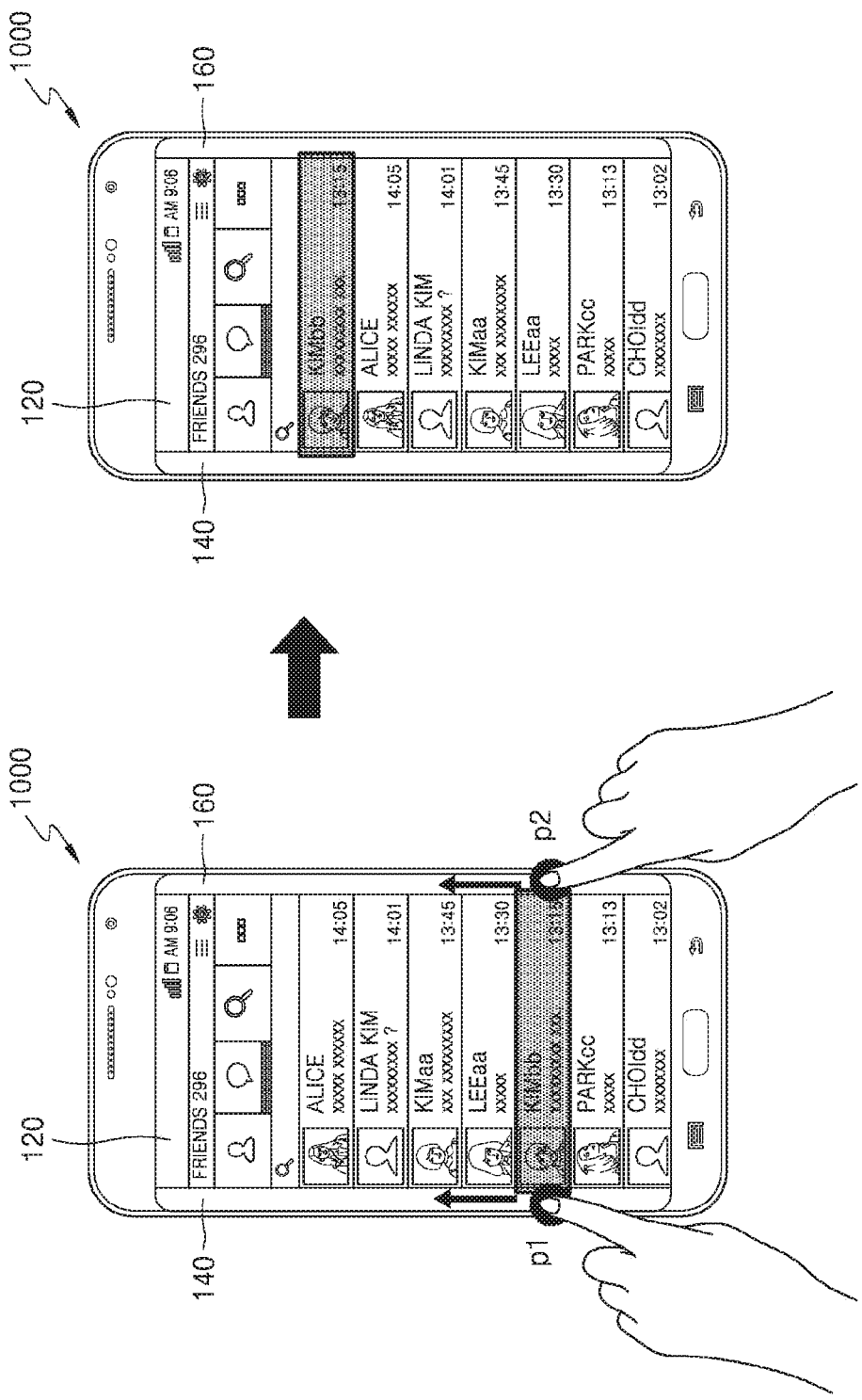
FIG. 11 illustrates an example of performing a pre-set operation corresponding to a combination of a first gesture and a second gesture, in a method of controlling an electronic apparatus, according to an embodiment.

FIG. 11 illustrates an example of performing the pre-set operation based on the combination of the first and second gestures, in a method of controlling the electronic apparatus 1000, according to an embodiment.

Referring to FIG. 11, an operation of changing a location of an item displayed in an execution window of an application, based on the combination of the first and second gestures, in the electronic apparatus 1000, will be described.

The method of controlling the electronic apparatus 1000 according to an embodiment may include performing the pre-set operation with respect to the item displayed in the execution window of the application when a relative relationship between the first location p1 and the second location p2 corresponds to substantially the same level. For example, the application executed in the foreground of the electronic apparatus 1000 may be a message service application, and the displayed item may be an item in a message list.

In this case, the pre-set operation with respect to the item selected in the execution window of the application, the item corresponding to the first location p1 and the second location p2, may be performed. The selection of the item will be described in detail.

The performing of the pre-set operation based on the combination of the first and second gestures, in the method of controlling the electronic apparatus 1000 according to an embodiment, may include selecting an item in the execution window of the application, the item corresponding to the first location p1 and the second location p2.

The selected item may refer to the item in the execution window of the executed application, the item corresponding to the first location p1 and the second location p2. Also, the selected item may refer to an item selected in the touch screen 100 based on the first location p1 and the second location p2 based on a touch input of a user.

The selected item may refer to a corresponding item on the touch screen 100, when the first location p1 and the second location p2 are within an area displayed due to the item.

Alternatively, the selected item may refer to an item having a greatest display area overlapping a selected area between the first virtual line L1 and the second virtual line L2, from among items on the touch screen 100.

The selecting of the item in the execution window of the application, the item corresponding to both of the first location p1 and the second location p2, may be performed between operation S710 and operation S720.

The pre-set operation corresponding to the combination of the first and second gestures may be an operation performed on the item selected in operation S730.

The pre-set operation corresponding to the combination of the first and second gestures may be the operation of changing the display location of the selected item in the execution window of the application.

For example, when the combination of the first and second gestures is the combination of the first gesture of sliding from the first location p1 as the start point in the first direction of the first edge screen 140 and the second gesture of sliding from the second location p2 as the start point in the first direction of the second edge screen 160, the selected item may be moved in the first direction, so that the display location of the selected item is changed in the execution window of the application.

Also, as illustrated in FIG. 11, it may be assumed that the application executed in the electronic apparatus 1000 is a message service application.

The message service application may include a plurality of message items. The plurality of message items may be displayed as a list in an execution window of the message service application.

The selected item corresponding to both of the first location p1 and the second location p2 may be a message item associated with a communication with "Kimbb."

The electronic apparatus 1000 may simultaneously receive the combination of the first gesture of sliding from the first location p1 as the start point in the first direction of the first edge screen 140 and the second gesture of sliding from the second location p2 as the start point in the first direction of the second edge screen 160.

In this case, based on the combination of the first and second gestures, an operation of moving the selected item in the first direction may be performed in order to change a display location of the selected item in the execution window of the application.

As illustrated in FIG. 11, the item may be moved in the first direction to an end of the touch screen 100 and displayed.

When the first direction is a direction toward an upper side, the item may be displayed at an uppermost location of the touch screen 100.

Although not shown, the pre-set operation with respect to the item based on the combination of the first gesture and the second gesture may be an operation of changing the display location of the item to a specific location.

The specific location may be a location on which another item is displayed, rather than the item corresponding to the both of the first location p1 and the second location p2.

Alternatively, the specific location may be a location of another item corresponding to both of a third location at which the first gesture is ended and a fourth location at which the second gesture is ended.

The third location may correspond to a touch end point of the first gesture on the first edge screen 140 and the fourth location may correspond to a touch end point of the second gesture on the second edge screen 160.

In this case, a third virtual line horizontal to the third location and a fourth virtual line horizontal to the fourth location may be defined, and the electronic apparatus 1000 may move the selected item to the specific location only when a distance between the third virtual line and the fourth virtual line is equal to or less than a pre-set critical value.

The item corresponding to both of the third location and the fourth location may denote a corresponding item when both of the third location and the fourth location are within an area of the touch screen 100, on which the item is displayed.

Alternatively, the item corresponding to both of the third location and the fourth location may denote an item having a greatest display area overlapping an area between the third virtual line of the third location and the fourth virtual line of the fourth location, from among items.

The specific location may be a location to which a selected item is to be moved, and the "location to which the selected item is to be moved" may denote a location corresponding to the third location and the fourth location.

When the selected item is moved to the specific location, other items displayed at the specific location may be moved to an adjacent location. Alternatively, other items displayed at the specific location may be moved to a location at which the selected item is previously displayed.

Figure 12:
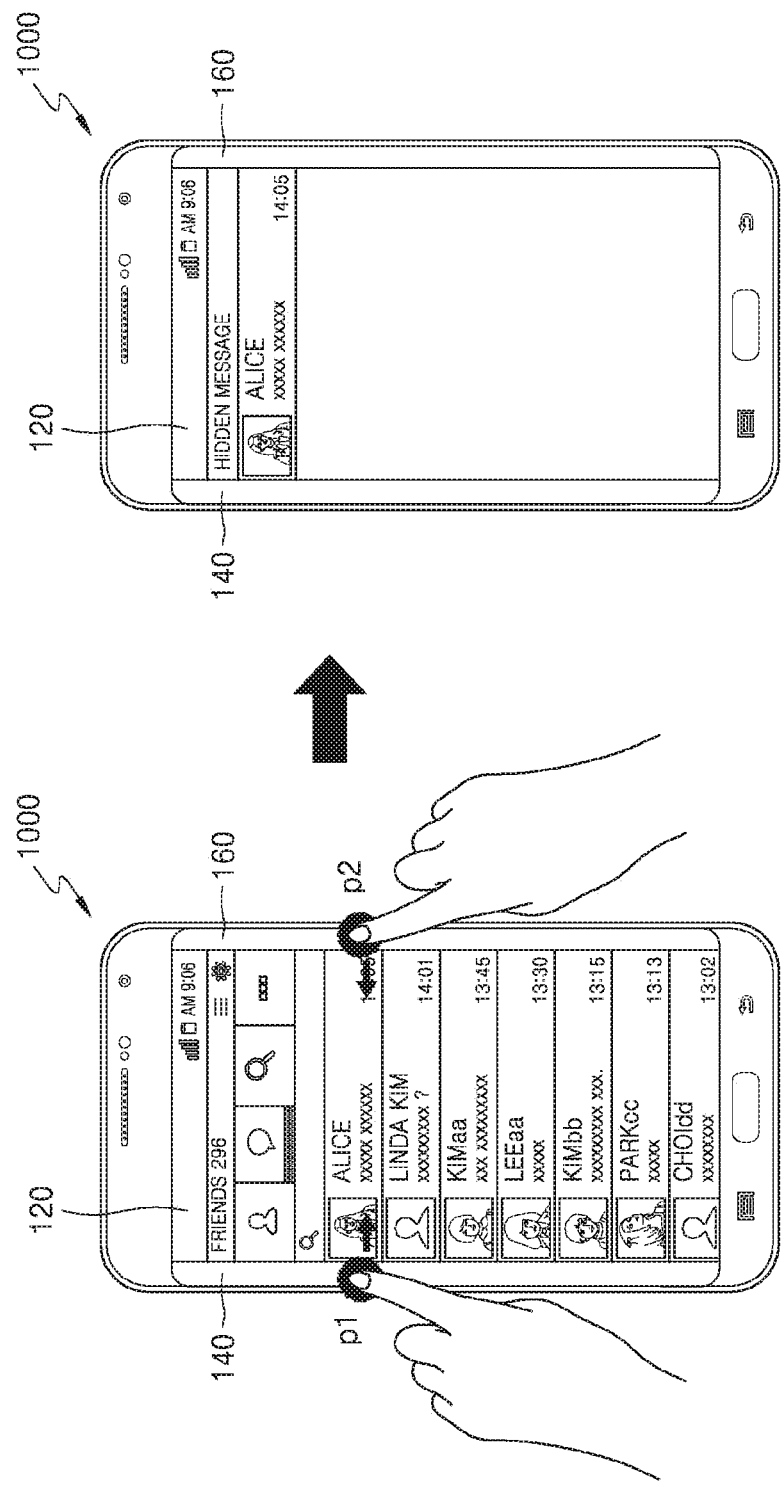
FIG. 12 illustrates an example of performing a pre-set operation corresponding to a combination of a first gesture and a second gesture, in a method of controlling an electronic apparatus, according to an embodiment.

FIG. 12 illustrates an example of performing the pre-set operation based on the combination of the first and second gestures, in a method of controlling the electronic apparatus 1000, according to an embodiment.

Referring to FIG. 12, the operation of hiding a selected item in an execution window of an application, based on the combination of the first and second gestures, will be described.

When the combination of the first and second gestures is the combination of the first gesture of sliding from the first location p1 as the start point toward an inner side of the touch screen 100 and the second gesture of sliding from the second location p2 as the start point toward the inner side of the touch screen 100, the selected item may be hidden in the execution window.

As illustrated in FIG. 12, it may be assumed that the application executed in the electronic apparatus 1000 is a message service application.

The message service application may include a plurality of message items. The plurality of message items may be displayed as a list in the execution window of the message service application.

The item corresponding to both of the first location p1 and the second location p2 may be a message item associated with a communication with "Alice." The selected item may refer to an item partially overlapping both of the first location p1 and the second location p2.

When the electronic apparatus 1000 simultaneously receives the combination of the first gesture of sliding from the first location p1 as the start point toward the inner side of the touch screen 100 and the second gesture of sliding from the second location p2 as the start point toward the inner side of the touch screen 100, the electronic apparatus 1000 may perform the pre-set operation of hiding the selected item in the execution window of the application, the pre-set operation corresponding to the combination of the first and second gestures.

As illustrated in FIG. 12, the hidden message item may be revealed in the message service application via a previous operation.

A method of performing a touch input according to an embodiment may include using the edge screens 140 and 160 at both sides of the electronic apparatus 1000, the edge screens 140 and 160 being configured to receive the touch input, and simplifying a process of the touch operation in the electronic apparatus 1000 by generating combinations of gestures corresponding to touch operations, wherein the combinations of gestures have a touch location as a start point and correspond to a plurality of operations.

In addition, the touch operation of the electronic apparatus 1000 having the both side edge screens 140 and 160, according to an embodiment, may be embodied as a computer code in a computer-readable recording medium. The computer code may be embodied by one of ordinary skill in the art, based on the method described above. The method of the present disclosure is implemented when the computer code is implemented in the computer.

Figure 13:
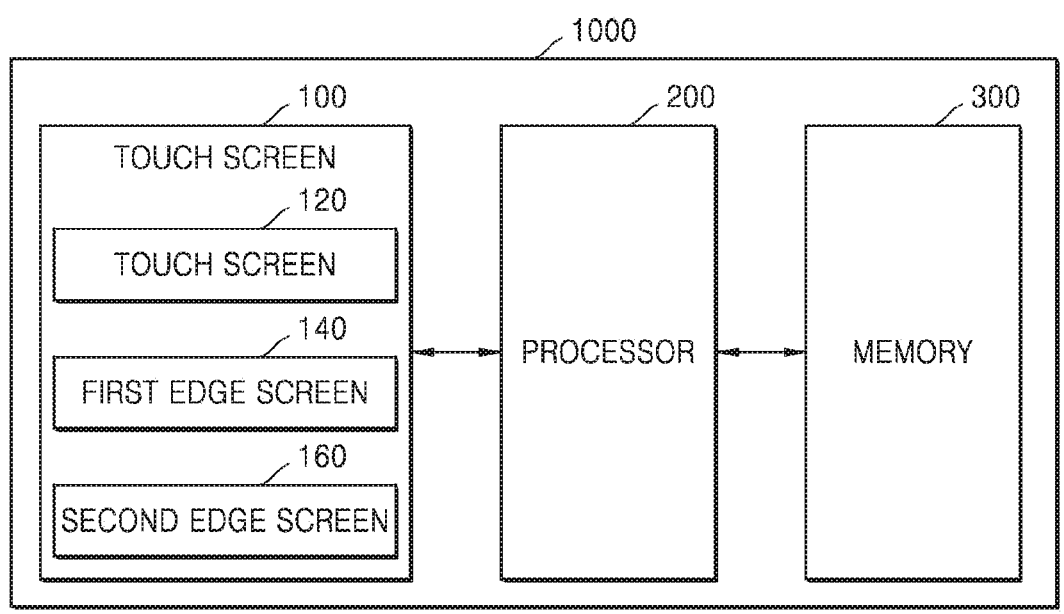
FIG. 13 is a block diagram of an electronic apparatus according to an embodiment.

FIG. 13 is a block diagram of the electronic apparatus 1000 according to an embodiment.

Referring to FIG. 13, the electronic apparatus 1000 according to an embodiment may include the touch screen 100, a processor 200, and a memory 300.

Also, the touch screen 100 may include, at a front side, the main screen 120, which is flat, and the edge screens 140 and 160 provided at both sides of the main screen 120. Also, the touch screen 100 may include the first edge screen 140 at an edge of the main screen 120 and the second edge screen 160 at another edge of the main screen 120, the other edge facing the edge.

The touch screen 100 may display an execution window of an application executed in the electronic apparatus 1000. The touch screen 100 may display the execution window on all of the main screen 120 and the first and second edge screens 140 and 160, or the touch screen 100 may display the execution window on the main screen 120 or the first and second edge screens 140 and 160. Also, the touch screen 100 may display at least one item in the execution window.

The touch screen 100 may include various types of displays, such as a liquid crystal display (LCD), an organic light-emitting diode (OLED) display, an active-matrix organic light-emitting diode (AM-OLED) display, a plasma display panel (PDP), etc. Also, the touch screen 100 may be realized to be flexible, transparent, or wearable.

The memory 300 may store at least one program executable by the processor 200.

The processor 200 may execute the at least one program to cause the electronic apparatus 1000 to perform a pre-set operation, and the electronic apparatus 1000 may include at least one processor.

The processor 200 may sense a touch and a gesture of a user. The touch screen 100 may include a touch sensor configured to sense the touch and the gesture of the user. When the user physically contacts the touch screen 100, the processor 200 may sense the physical contact of the user based on pressure or electricity.

The processor 200 may sense a touch and a gesture using fingers of both hands of a user. For example, the processor 200 may sense the touch and the gesture using an index finger of one hand and an index finger of the other hand of the user.

Also, the processor 200 may sense a touch and a gesture using two fingers of one hand of a user. For example, the processor 200 may sense the touch and the gesture using a thumb of one hand and an index finger of the same hand of the user.

The processor 200 may sense a touch and a gesture using an input device, such as a pen, in addition to the touch and the gesture using the finger of the user.

The processor 200 may sense a first touch with respect to the first edge screen 140 and a second touch with respect to the second edge screen 160.

The processor 200 may determine a case in which the touch screen 100 simultaneously senses the first touch and the second touch.

Here, when the processor 200 determines the case in which the touch screen 100 "simultaneously senses the first touch and the second touch," it may include a case in which a start time of the first touch and a start time of the second touch, sensed by the touch screen 100, perfectly correspond to each other. Also, when the processor 200 determines the case in which the touch screen 100 "simultaneously senses the first touch and the second touch," it may include a case in which while any one of the first touch and the second touch is being sensed by the touch screen 100, the other one is sensed by the touch screen 100.

Also, when the processor 200 determines the case in which the touch screen 100 "simultaneously senses the first touch and the second touch," it may include a case in which there exists a temporal section in which the first touch and the second touch are sensed together by the touch screen 100.

When the touch screen 100 senses the touch of the user, the processor 200 may determine a location on the touch screen 100, at which the touch of the user is sensed, as a location of the touch.

When the first touch and the second touch are sensed, the processor 200 may determine the locations of the first touch and the second touch. In this case, the processor 200 may determine a location on the first edge screen 140, at which the first touch is sensed, as a first location p1, and a location on the second edge screen 160, at which the second touch is sensed, as a second location p2.

The processor 200 may determine whether or not a relative relationship between the first location p1 and the second location p2 satisfies a pre-set condition.

When the relative relationship between the first location p1 and the second location p2 satisfies the pre-set condition, the processor 200 may determine that the first location p1 and the second location p2 are within substantially the same level. When the relative relationship between the first location p1 and the second location p2 does not satisfy the pre-set condition, the processor 200 may determine that the first location p1 and the second location p2 are at different levels.

When the relative relationship between the first location p1 and the second location p2 sensed by the touch screen 100 corresponds to substantially the same level, the processor 200 may perform a pre-set operation based on a combination of the first and second touches sensed by the touch screen 100.

When the relative relationship between the first location p1 and the second location p2 sensed by the touch screen 100 corresponds to the different level, the processor 200 may perform no operation regardless of the combination of the first and second gestures sensed by the touch screen 100.

Also, the processor 200 may determine a selected area on the touch screen 100 based on the first location p1 and the second location p2.

The processor 200 may sense the gesture of the user having, as a start point thereof, a location at which the touch is sensed. The processor 200 may sense a first gesture having the first location p1 as the start point, and a second gesture having the second location p2 as the start point.

In this case, the first gesture having the first location p1 as the start point or the second gesture having the second location p2 as the start point may include any one of sliding, clicking, and maintaining.

The processor 200 may sense a combination of the first and second gestures.

The processor 200 may determine a case in which the touch screen 100 simultaneously senses the first gesture and the second gesture.

When the processor 200 determines the case in which the touch screen 100 "simultaneously senses the first gesture and the second gesture," it may include a case in which a start time of the first gesture and a start time of the second gesture, sensed by the touch screen 100, perfectly correspond to each other. Also, when the processor 200 determines the case in which the touch screen 100 "simultaneously senses the first gesture and the second gesture," it may include a case in which while any one of the first gesture and the second gesture is being sensed by the touch screen 100, the other one is sensed by the touch screen 100.

Also, when the processor 200 determines the case in which the touch screen 100 "simultaneously senses the first gesture and the second gesture," it may include a case in which there exists a temporal section in which the first gesture and the second gesture are sensed together by the touch screen 100.

The processor 200 may perform various pre-set operations based on various combinations of the first gesture and the second gesture. Hereinafter, detailed embodiments will be described.

According to an embodiment, the processor 200 may perform an operation of turning off the touch screen 100 of the electronic apparatus 1000, based on the combination of the first gesture of sliding from the first location p1 as a start point toward an inner side of the touch screen 100 and the second gesture of sliding from the second location p2 as a start point toward the inner side of the touch screen 100.

The processor 200 may determine an application executed in the foreground. The processor 200 may determine the pre-set operation with respect to the application, the pre-set operation corresponding to the combination of the first and second gestures.

The processor 200 may perform various operations with respect to the application that is executed, based on the combination of the first and second gestures. Hereinafter, detailed embodiments will be described.

According to an embodiment, the processor 200 may perform an operation of enlarging a display size of text displayed in an application of the electronic apparatus 1000, based on the combination of the first gesture of clicking on the first location p1 and the second gesture of clicking on the second location p2.

The processor 200 may enlarge the size of the text of a selected area in a web page, based on the first location p1 and the second location p2 corresponding to substantially the same level.

According to an embodiment, the processor 200 may perform an operation of enlarging a display size of an image displayed in an application of the electronic apparatus 1000, based on the combination of the first gesture of sliding from the first location p1 as the start point in a first direction of the first edge screen 140 and the second gesture of sliding from the second location p2 as the start point in a first direction of the second edge screen 160.

The processor 200 may enlarge a selected area of the image, the selected area being based on the first location p1 and the second location p2, to a selected area based on a first touch end point of the first gesture on the first edge screen 140 and a second touch end point of the second gesture on the second edge screen 160.

According to an embodiment, the processor 200 may perform an operation of moving a reproduction point of a video executed in an application of the electronic apparatus 1000, based on the combination of the first gesture of maintaining a touch on the first location p1 and the second gesture of sliding from the second location p2 as the start point in the first direction of the second edge screen 160.

According to an embodiment, the processor 200 may perform an operation of changing a reproduction volume of a video executed in an application of the electronic apparatus 1000, based on the combination of the first gesture of sliding from the first location p1 as the start point in the first direction of the first edge screen 140 and the second gesture of maintaining a touch on the second location p2.

The processor 200 may select an item displayed in an execution window of an application.

The processor 200 may perform various operations with respect to the selected item, based on the combination of the first and second gestures. Hereinafter, detailed embodiments will be described.

According to an embodiment, the processor 200 may perform an operation of changing a display location of the selected item in the execution window of the application of the electronic apparatus 1000, based on the combination of the first gesture of sliding from the first location p1 as the start point in the first direction of the first edge screen 140 and the second gesture of sliding from the second location p2 as the start point in the first direction of the second edge screen 160.

According to an embodiment, the processor 200 may perform an operation of hiding the selected item in the execution window of the application of the electronic apparatus 1000, based on the combination of the first gesture of sliding from the first location p1 as the start point toward an inner side of the touch screen 100 and the second gesture of sliding from the second location p2 as the start point toward the inner side of the touch screen 100.

Figure 14:
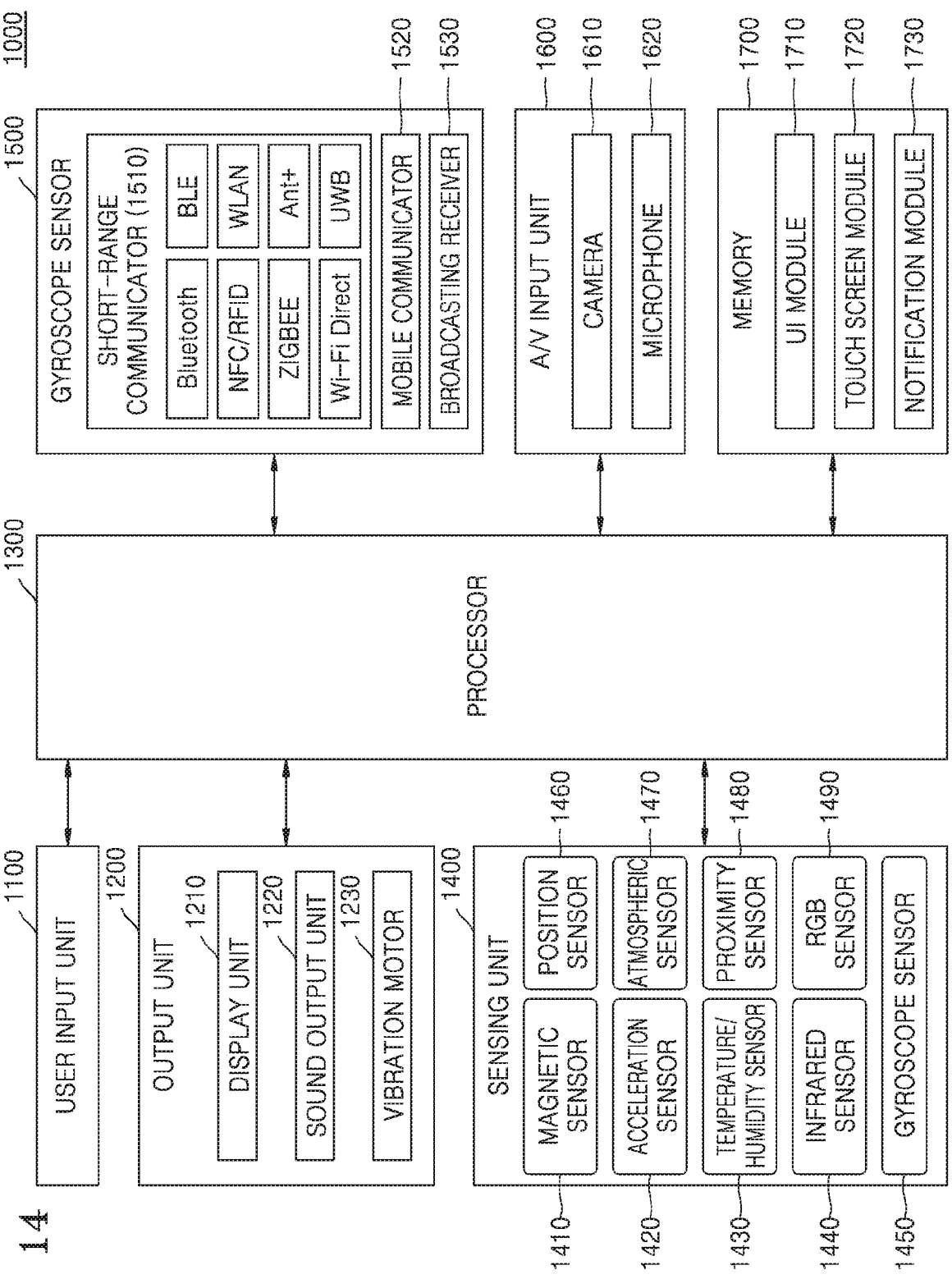
FIG. 14 is a block diagram of an electronic apparatus according to another embodiment.

FIG. 14 is a block diagram of the electronic apparatus 1000 according to another embodiment.

As illustrated in FIG. 14, in some embodiments, the electronic apparatus 1000 may include a user input unit 1100, an output unit 1200, a processor 1300, a sensing unit 1400, a communication unit 1500, an audio/video (A/V) input unit 1600, and a memory 1700.

The user input unit 1100 may refer to a device used by a user to input data for controlling the electronic apparatus 1000. For example, the user input unit 1100 may include, but is not limited to, a key pad, a dome switch, a touch pad (a touch capacitance method, a pressure resistive method, an infrared sensing method, a surface ultrasonic conductive method, an integral tension measuring method, a piezo effect method, etc.), a jog wheel, a jog switch, etc.

A function of the user input unit 1100 and a function of a display unit 1210 to be described below may be embodied together in the form of the touch screen 100.

The output unit 1200 may output an audio signal, a video signal, or a vibration signal, and may include the display unit 1210, a sound output unit 1220, and a vibration motor 1230.

The display unit 1210 may display and output information processed in the electronic apparatus 1000. Meanwhile, when a layered structure of the display unit 1210 and the touch pad forms the touch screen 100, the display unit 1210 may be used as an input device, in addition to an output device. The display unit 1210 may include at least one of an LCD, a thin film transistor LCD, an OLED display, a flexible display, a three-dimensional (3D) display, and an electrophoretic display. The electronic apparatus 1000 may include at least two display units 1210, according to an embodiment. Here, the at least two display units 1210 may be arranged to face each other by using a hinge.

The sound output unit 1220 may output audio data received from the communication unit 1500 or stored in the memory 1700. The vibration motor 1230 may output a vibration signal. For example, the vibration motor 1230 may output the vibration signal corresponding to an output of audio data or video data (for example, a call signal reception sound, a message reception sound, etc.). Also, the vibration motor 1230 may output the vibration signal when a touch is input on the touch screen 100.

The processor 1300 may control general operations of the electronic apparatus 1000, in general. The processor 1300 of FIG. 14 may be the processor 200 of FIG. 13, according to an embodiment.

For example, the processor 1300 may execute programs stored in the memory 1700 to generally control the user input unit 1100, the output unit 1200, the sensing unit 1400, the communication unit 1500, the A/V input unit 1600, etc. The processor 1300 may execute the programs stored in the memory 1700 to cause the electronic apparatus 1000 to perform the functions described with reference to FIGS. 1 through 14.

The sensing unit 1400 may sense a state of the electronic apparatus 1000 or a state around the electronic apparatus 1000 and may transmit the sensed information to the processor 1300.

The sensing unit 1400 may include, but is not limited to, at least one of a magnetic sensor 1410, an acceleration sensor 1420, a temperature/humidity sensor 1430, an infrared sensor 1440, a gyroscope sensor 1450, a position sensor (for example, a global positioning system (GPS)) 1460, an atmospheric sensor 1470, a proximity sensor 1480, and an RGB sensor (an illuminance sensor) 1490.

The communication unit 1500 may include at least one component configured to enable communication between the electronic apparatus 1000 and an external device (not shown). For example, the communication unit 1500 may include a short-range communicator 1510, a mobile communicator 1520, and a broadcasting receiver 1530.

The A/V input unit 1600 may be used for an input of an audio signal or a video signal, and may include a camera 1610, a microphone 1620, etc.

The memory 1700 may store programs for processing and controlling operations of the processor 1300, and may store data input to the electronic apparatus 1000 or output from the electronic apparatus 1000.

The memory 1700 of FIG. 14 may be the memory 300 of FIG. 13, according to an embodiment.

The memory 1700 may include at least one type of storage medium from among a flash memory type, a hard disk type, a multimedia card micro type, a card type (for example, SD or XD memory, etc.), random access memory (RAM), static RAM (SRAM), read-only memory (ROM), electrically erasable programmable ROM (EEPROM), programmable ROM (PROM), a magnetic memory, a magnetic disk, and an optical disk.

The programs stored in the memory 1700 may be classified into a plurality of modules based on functions thereof. For example, the programs may be classified into a user interface (UI) module 1710, a touch screen module 1720, a notification module 1730, etc.

The UI module 1710 may provide a specialized UI, a specialized graphics UI (GUI), etc., connected with the electronic apparatus 1000, based on each application. The touch screen module 1720 may sense a touch gesture on a touch screen of a user and transmit information about the touch gesture to the processor 1300. The touch screen module 1720 according to some embodiments may recognize and analyze a touch code. The touch screen module 1720 may be formed as separate hardware including a controller.

Various sensors may be provided in or around the touch screen 100 to sense a touch or an approximate touch on the touch screen 100. An example of the sensor configured to sense the touch on the touch screen 100 may be a haptic sensor. The haptic sensor refers to a sensor configured to sense contact of a specific object to a same degree as human sensitivity or to a higher degree. The haptic sensor may sense various information, such as roughness of a contact surface, rigidity of a contact object, a temperature of a contact point, etc.

Further, another example of the sensor configured to sense the touch on the touch screen 100 may be a proximity sensor. The proximity sensor refers to a sensor configured to sense an object approaching a certain sensed surface, or whether or not an object exists around the certain sensed surface, by using the electromagnetic force or infrared rays, without mechanical contact. The touch and the gesture of the user may include tapping, touching & holding, double tapping, dragging, penning, flicking, dragging and dropping, swiping, etc.

The notification module 1730 may generate a signal configured to notify an occurrence of an event of the electronic apparatus 1000.

The one or more embodiments of the present disclosure may be embodied as a recording medium, e.g., a program module to be executed in computers, which include computer-readable commands. The computer storage medium may include any usable medium that may be accessed by computers, volatile and non-volatile media, and detachable and non-detachable media. Also, the computer storage medium may include a computer storage medium and a communication medium. The computer storage medium includes all of volatile and non-volatile media, and detachable and non-detachable media which are designed to store information including computer readable commands, data structures, program modules, or other data. The communication medium includes computer-readable commands, a data structure, a program module, and other transmission mechanisms, and includes other information transmission media.

Also, in this specification, the term "unit" may be a hardware component, such as a processor or a circuit, and/or a software component executed by the hardware component, such as the processor.

While the present disclosure has been particularly shown and described with reference to example embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the disclosure. For example, each component described in a single type may be executed in a distributed manner, and components described distributed may also be executed in an integrated form.

The scope of the present disclosure is indicated by the claims rather than by the detailed description of the disclosure, and it should be understood that the claims and all modifications or modified forms drawn from the concept of the claims are included in the scope of the present disclosure.

What is claimed is:

1. A method of controlling an electronic apparatus having a plurality of edge portions, the method comprising:
   identifying an application executed in the electronic apparatus;
   detecting a first touch on a first edge portion of a touch screen of the electronic apparatus and a second touch on a second edge portion of the touch screen of the electronic apparatus;
   identifying a first location on the first edge portion, the first location corresponding to the first touch, and a second location on the second edge portion, the second location corresponding to the second touch;
   detecting a first gesture starting at the first location on the first edge portion of the electronic apparatus and a second gesture starting at the second location on the second edge portion;
   when the application executed in the electronic apparatus is identified as a first application, performing a first predetermined operation of the electronic apparatus, based on a combination of the first gesture and the second gesture; and
   when the application executed in the electronic apparatus is identified as a second application, performing a second predetermined operation of the electronic apparatus, based on a combination of the first gesture and the second gesture,
   wherein a predetermined operation corresponding to the combination of the first gesture and the second gesture is differently set for each application of the electronic apparatus,
   wherein when the application executed in the electronic apparatus is a video reproduction application and the first gesture is maintaining the first touch at the first location on the first edge portion for a period of time equal to or greater than a pre-set period of time and the second gesture is sliding from the second location on the second edge portion, the predetermined operation corresponding to the combination of the first gesture and the second gesture is moving a reproduction point of a video that is reproduced to a target point, where the target point is determined by a sliding distance of the second gesture, and
   wherein when the application executed in the electronic apparatus is a video reproduction application and the first gesture is sliding from the first location on the first edge portion and the second gesture is maintaining the second touch at the second location on the second edge portion, the predetermined operation corresponding to the combination of the first gesture and the second gesture is changing the reproduction volume of the video reproduced where the change of the reproduction volume corresponds to a ratio of a moving distance of the first gesture to a total length of a first edge screen and a start point of the changed reproduction volume is a current reproduction volume of the video.

2. The method of claim 1, wherein the identifying of the first location on the first edge portion, the first location corresponding to the first touch, and the second location on the second edge portion, the second location corresponding to the second touch, comprises:
   identifying the first location and the second location, when, while either one of the first touch and the second touch is being sensed, the other one of the first touch and the second touch is sensed.

3. The method of claim 1, further comprising:
   identifying whether or not a relative relationship between the first location and the second location satisfies a predetermined condition.

4. The method of claim 1, wherein the performing of the first predetermined operation of the electronic apparatus, based on the combination of the first gesture and the second gesture, comprises:
   performing the first predetermined operation, when, while either one of the first gesture and the second gesture is being sensed, the other one of the first gesture and the second gesture is sensed.

5. The method of claim 1, wherein the performing of the first predetermined operation of the electronic apparatus, based on the combination of the first gesture and the second gesture, comprises:
   identifying the first predetermined operation with respect to the first application, the first predetermined operation corresponding to the combination of the first gesture and the second gesture, and
   performing the first predetermined operation of the first application, the first predetermined operation corresponding to the combination of the first gesture and the second gesture.

6. The method of claim 5, further comprising:
   selecting an item corresponding to the first location and the second location, in an execution window of the first application executed in the electronic apparatus,
   wherein the first predetermined operation with respect to the first application comprises moving a display location of the selected item.

7. A non-transitory computer-readable recording medium having embodied thereon a program for executing the method of claim 1.

8. The method of claim 1, wherein the first gesture and the second gesture are detected only when the first touch and the second touch are simultaneously detected.

9. The method of claim 1, wherein when the application executed in the electronic apparatus is a message service application and the first gesture is sliding from the first location as a starting point toward an inner side of the touch screen and the second gesture is sliding from the second location as a starting point toward an inner side of the touch screen, the predetermined operation corresponding to the combination of the first gesture and the second gesture is hiding an item which is partially overlapping both of the first location and the second location in an execution window.

10. An electronic apparatus including a plurality of edge portion, the electronic apparatus comprising:
    a touch screen including a main screen and a first edge portion and a second edge portion;
    a memory storing at least one program; and
    at least one processor configured to execute the at least one program,
    wherein the at least one program comprises instructions to perform operations of:

identifying an application executed in the electronic apparatus, detecting a first touch on the first edge portion and a second touch on the second edge portion, identifying a first location on the first edge portion, the first location corresponding to the first touch, and a second location on the second edge portion, the second location corresponding to the second touch, detecting a first gesture starting at the first location on the first edge portion and a second gesture of starting from the second location on the second edge portion as a starting point in a direction parallel to a screen face of the second edge portion, when the application executed in the electronic apparatus is identified as a first application, performing a first predetermined operation of the electronic apparatus, based on a combination of the first gesture and the second gesture, and when the application executed in the electronic apparatus is identified as a second application, performing a second predetermined operation of the electronic apparatus, based on a combination of the first gesture and the second gesture, wherein a predetermined operation corresponding to the combination of the first gesture and the second gesture is differently set for each application of the electronic apparatus, wherein when the application executed in the electronic apparatus is a video reproduction application and the first gesture is maintaining the first touch at the first location on the first edge portion for a period of time equal to or greater than a pre-set period of time and the second gesture is sliding from the second location on the second edge portion, the predetermined operation corresponding to the combination of the first gesture and the second gesture is moving a reproduction point of a video that is reproduced to a target point, where the target point is determined by a sliding distance of the second gesture, and wherein when the application executed in the electronic apparatus is a video reproduction application and the first gesture is sliding from the first location on the first edge portion and the second gesture is maintaining the second touch at the second location on the second edge portion, the predetermined operation corresponding to the combination of the first gesture and the second gesture is changing the reproduction volume of the video reproduced where the change of the reproduction volume corresponds to a ratio of a moving distance of the first gesture to a total length of a first edge screen and a start point of the changed reproduction volume is a current reproduction volume of the video.

11. The apparatus of claim 10, wherein the at least one program further comprises instructions to perform an operation of identifying the first location and the second location, when, while either one of the first touch and the second touch is being sensed, the other one of the first touch and the second touch is sensed.

12. The apparatus of claim 10, wherein the at least one program further comprises instructions to perform an operation of identifying whether or not a relative relationship between the first location and the second location satisfies a predetermined condition.

13. The apparatus of claim 10, wherein the at least one program further comprises instructions to perform an operation of performing the first predetermined operation, when, while either one of the first gesture and the second gesture is being sensed, the other one of the first gesture and the second gesture is sensed.

14. The apparatus of claim 10, wherein the at least one program further comprises instructions to perform operations of:

identifying the first predetermined operation with respect to the first application, the first predetermined operation corresponding to the combination of the first gesture and the second gesture, and performing the first predetermined operation of the first application, the first predetermined operation corresponding to the combination of the first gesture and the second gesture.

15. The apparatus of claim 10, wherein when the application executed in the electronic apparatus is a message service application and the first gesture is sliding from the first location as a starting point toward an inner side of the touch screen and the second gesture is sliding from the second location as a starting point toward an inner side of the touch screen, the predetermined operation corresponding to the combination of the first gesture and the second gesture is hiding an item which is partially overlapping both of the first location and the second location in an execution window.

16. The apparatus of claim 10, wherein the at least one program comprises further instructions to perform operations of:

selecting an item corresponding to the first location and the second location, in an execution window of the first application executed in the electronic apparatus, wherein the first predetermined operation with respect to the first application comprises moving a display location of the selected item.

* * * * *